US009927551B2

(12) United States Patent
Hou et al.

(10) Patent No.: US 9,927,551 B2
(45) Date of Patent: Mar. 27, 2018

(54) MULTIFREQUENCY PROCESSING TO DETERMINE FORMATION PROPERTIES

(71) Applicant: Halliburton Energy Services, Inc., Houston, TX (US)

(72) Inventors: Junsheng Hou, Kingwood, TX (US); Luis Emilio San Martin, Houston, TX (US); Dagang Wu, Katy, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 480 days.

(21) Appl. No.: 14/442,932

(22) PCT Filed: Dec. 27, 2013

(86) PCT No.: PCT/US2013/078070
§ 371 (c)(1),
(2) Date: May 14, 2015

(87) PCT Pub. No.: WO2015/099779
PCT Pub. Date: Jul. 2, 2015

(65) Prior Publication Data
US 2016/0282503 A1   Sep. 29, 2016

(51) Int. Cl.
*G01V 3/38* (2006.01)
*E21B 49/00* (2006.01)
(Continued)

(52) U.S. Cl.
CPC ............... *G01V 3/38* (2013.01); *E21B 49/00* (2013.01); *G01V 3/28* (2013.01); *E21B 3/00* (2013.01); *E21B 47/122* (2013.01)

(58) Field of Classification Search
USPC .......................................... 324/338–341, 335
See application file for complete search history.

(56) References Cited

U.S. PATENT DOCUMENTS 4,283,953 A * 8/1981 Plona ..................... G01N 29/11
                                                              367/86
6,574,562 B2   6/2003 Tabarovsky et al.
(Continued)

FOREIGN PATENT DOCUMENTS

WO   WO-2013095997 A1   6/2013
WO   WO-2015/099779 A1   7/2015

OTHER PUBLICATIONS

"European Application Serial No. 13900043.4, Office Action dated Jun. 2, 2016", 2 pgs.
(Continued)

*Primary Examiner* — Vincent Q Nguyen
(74) *Attorney, Agent, or Firm* — Gilliam IP PLLC

(57) ABSTRACT

In some embodiments, an apparatus and a system, as well as a method and an article, may operate to obtain a plurality of measurements of a formation parameter, each measurement obtained in response to energy propagated into the formation at a plurality of frequencies of propagated energy; to process the measurements over each of the plurality of frequencies to obtain estimated values of the formation parameter; to select an estimated value from the obtained estimated values for each logging depth as a true measurement value for the logging depth based on one or more of the plurality of frequencies and a resistivity range; to generate a combination log that combines a plurality of the true measurement values for each logging depth; and to control a drilling operation based on the combination log. Additional apparatus, systems, and methods are disclosed.

24 Claims, 15 Drawing Sheets

(51) Int. Cl.
  *G01V 3/28* (2006.01)
  *E21B 3/00* (2006.01)
  *E21B 47/12* (2012.01)

(56) References Cited

U.S. PATENT DOCUMENTS

| | | | |
|---|---|---|---|
| 6,577,129 B1 * | 6/2003 | Thompson | G01V 3/30 324/338 |
| 6,777,940 B2 | 8/2004 | Macune | |
| 6,819,112 B2 | 11/2004 | Gianzero et al. | |
| 7,043,370 B2 | 5/2006 | Yu et al. | |
| 2003/0004646 A1 | 1/2003 | Haugland | |
| 2003/0137301 A1 | 7/2003 | Thompson et al. | |
| 2009/0192713 A1 | 7/2009 | Fang et al. | |

OTHER PUBLICATIONS

"International Application Serial No. PCT/US2013/078070, International Search Report dated Sep. 24, 2014", 3 pgs.

"International Application Serial No. PCT/US2013/078070, Written Opinion dated Sep. 24, 2014", 10 pgs.

"European Patent Application No. 13900043.4, Extended European Search Report dated Aug. 21, 2017", 7 pages.

Hou, et al., "A new multi-frequency triaxial array induction tool for enhancing evaluation of anisotropic formations and its field testing", SPWLA 54th Annual Logging Symposium, New Orleans, LA, (Jun. 22-26, 2013), Jan. 1, 2013, 1-17.

* cited by examiner

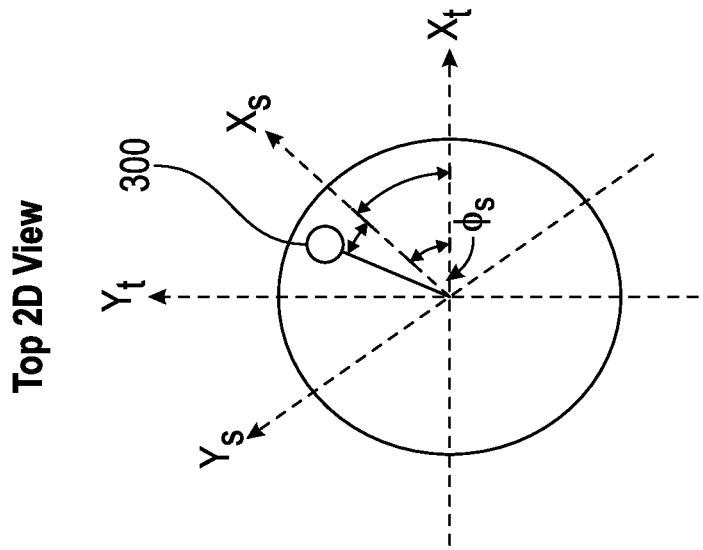
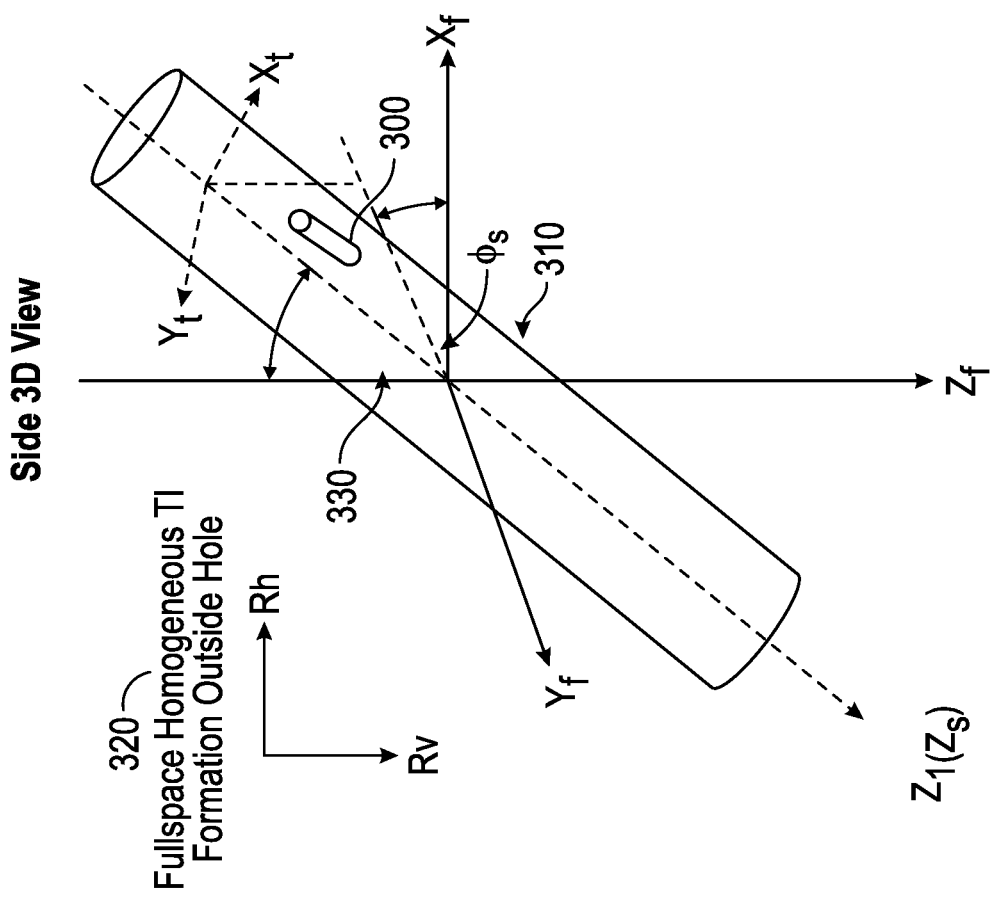
FIG. 3B
FIG. 3A

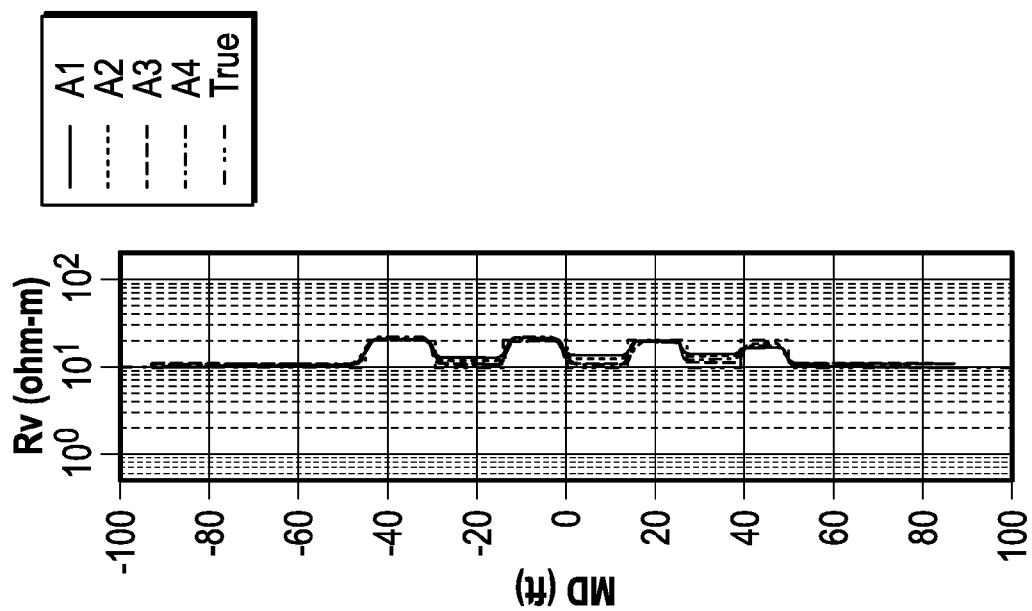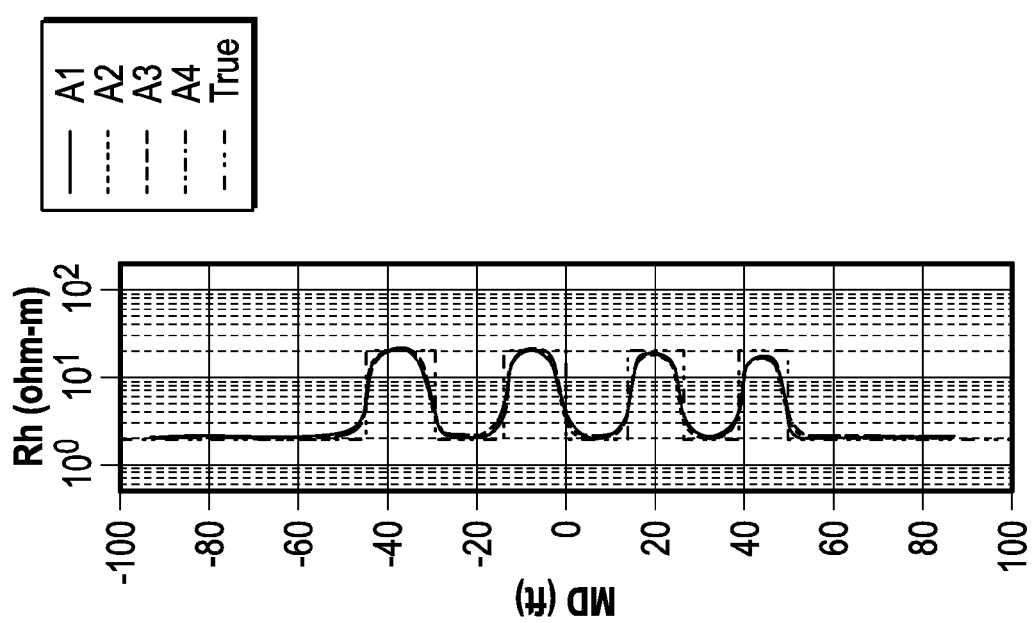
FIG. 5B

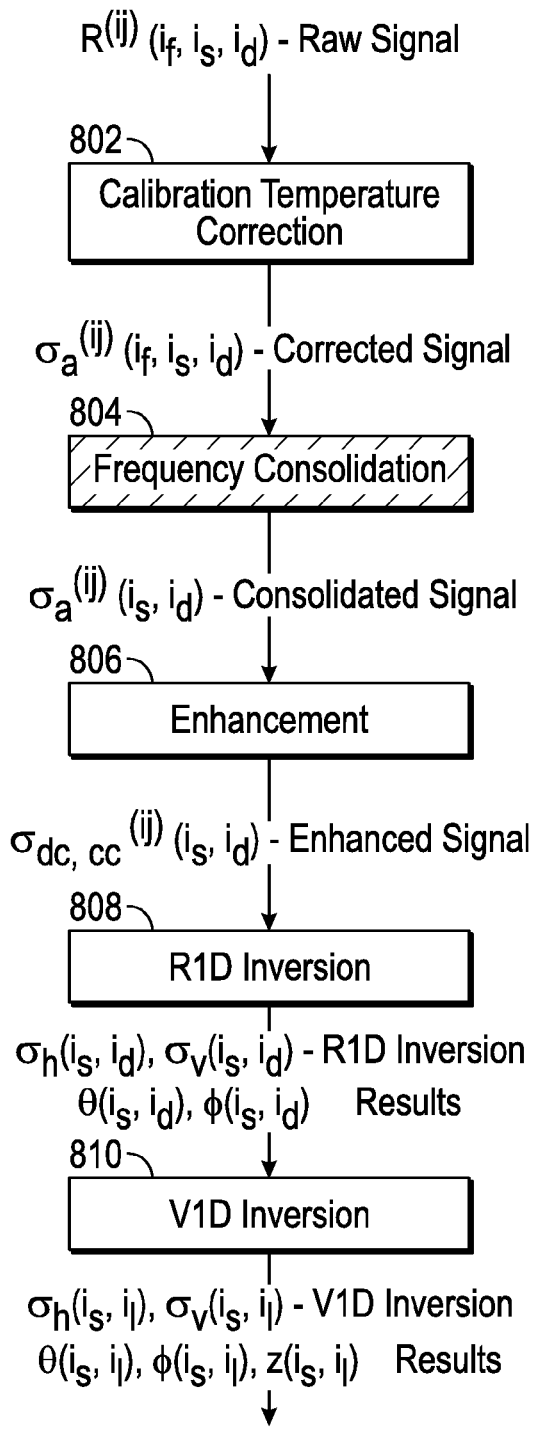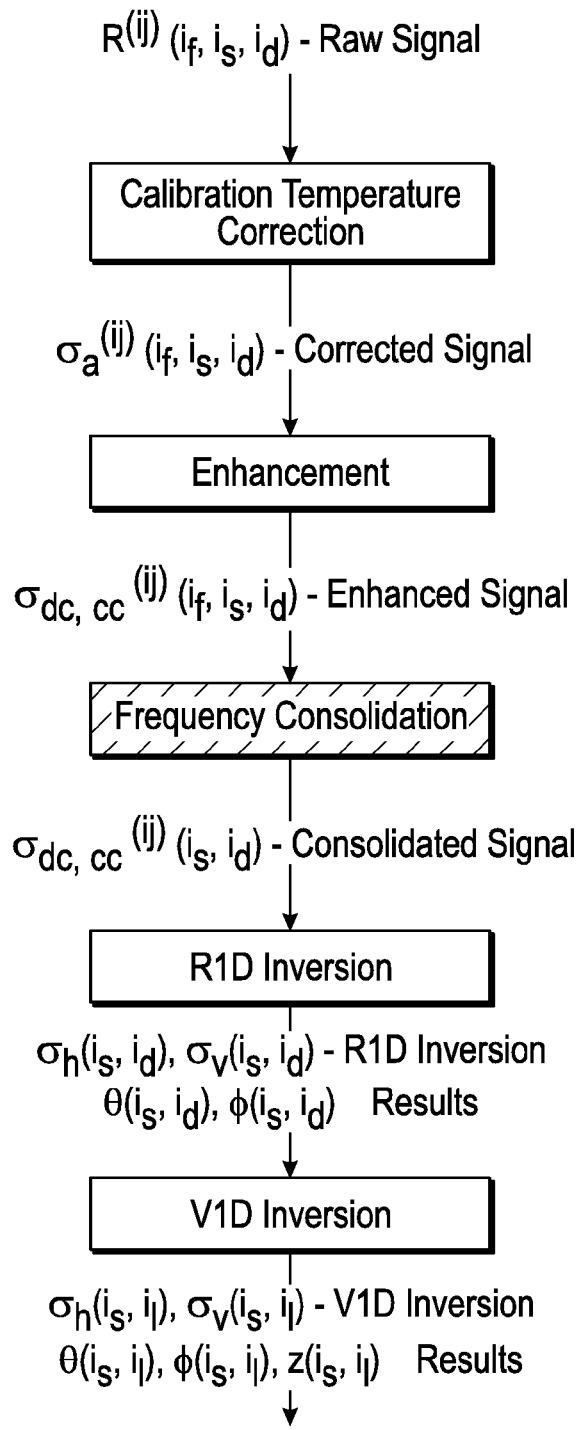
FIG. 8A
FIG. 8B

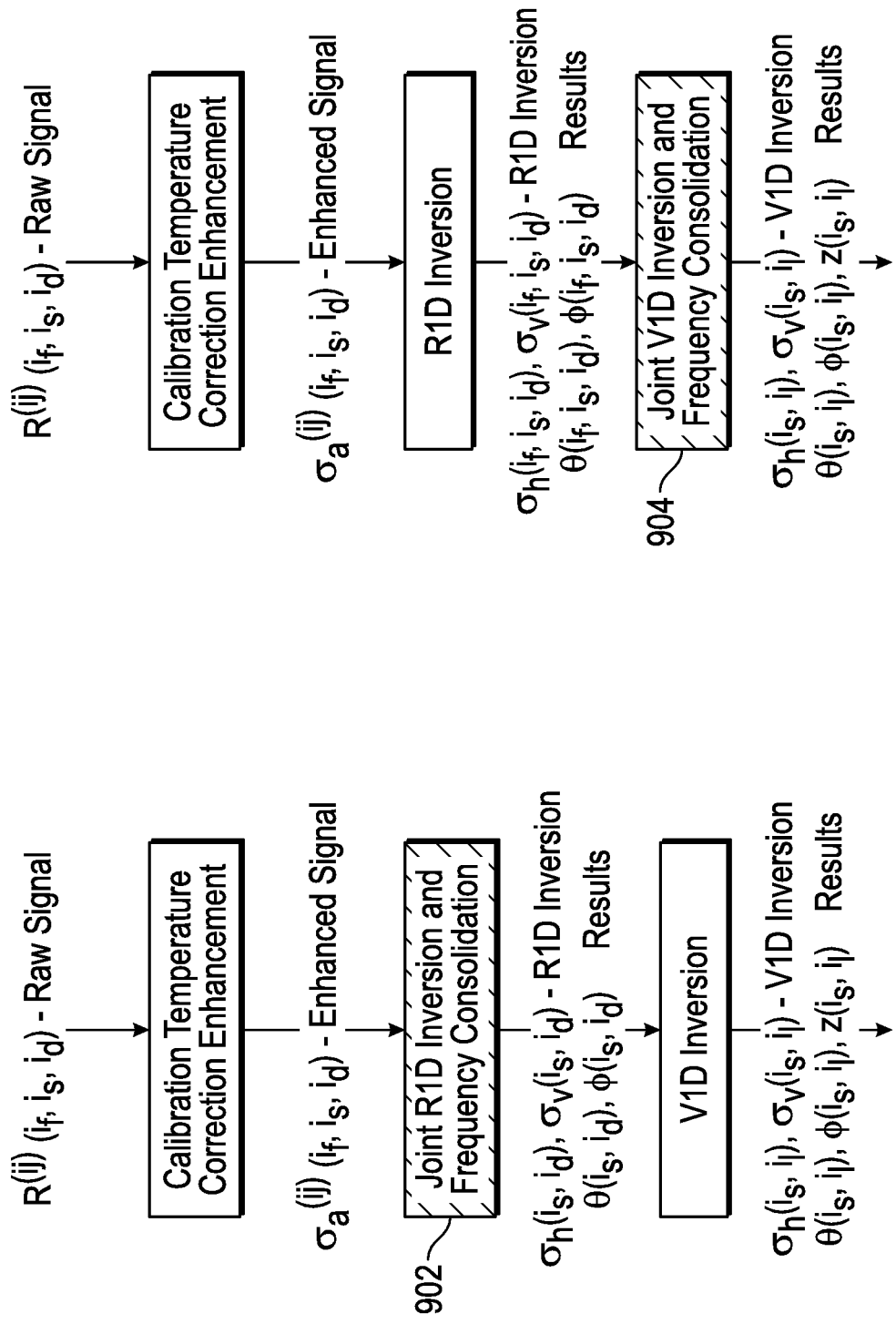

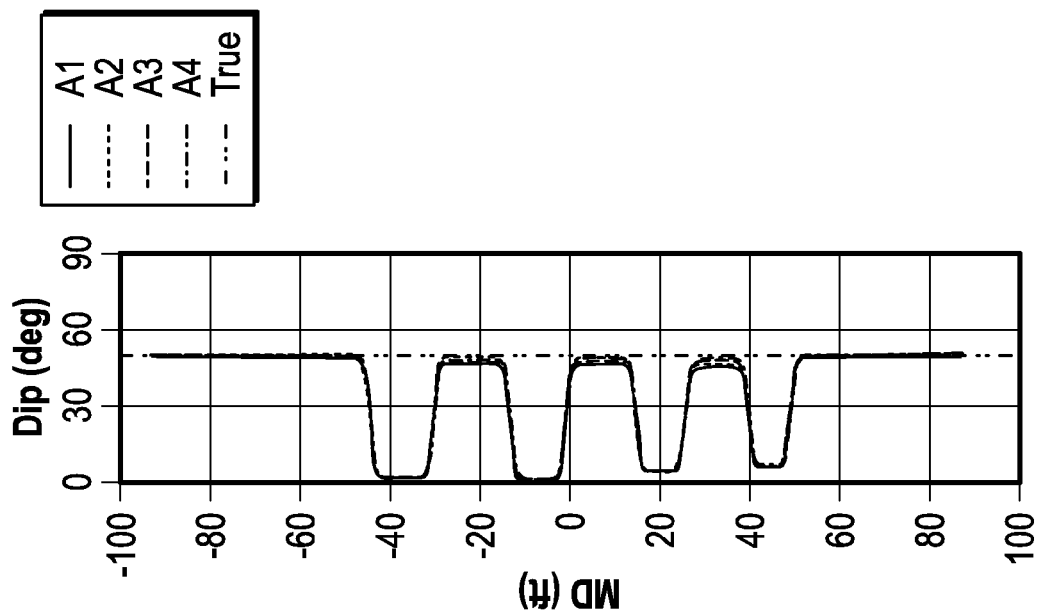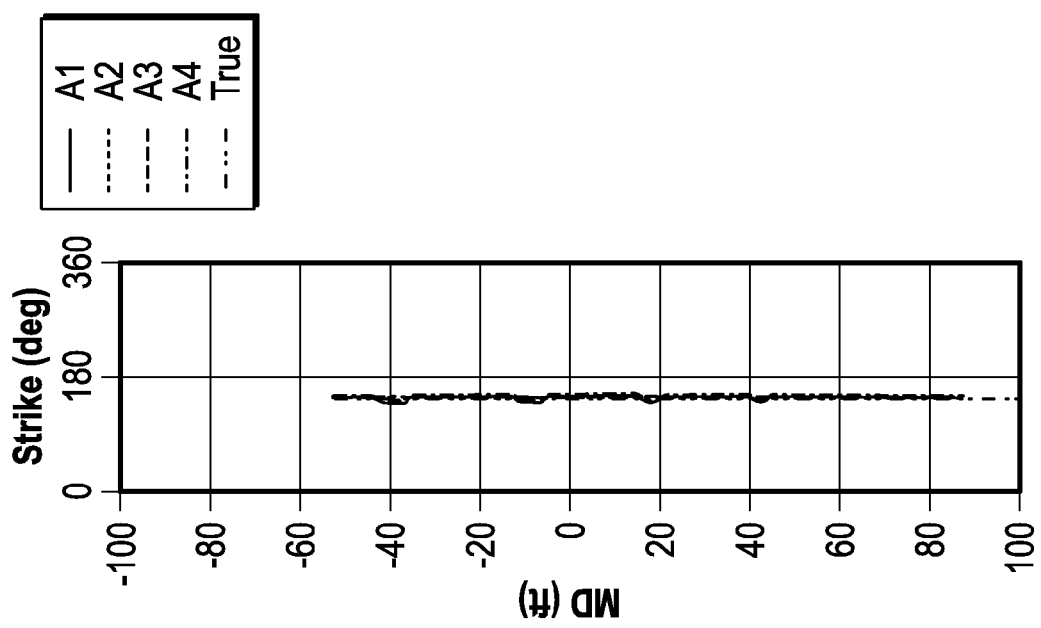
FIG. 10A

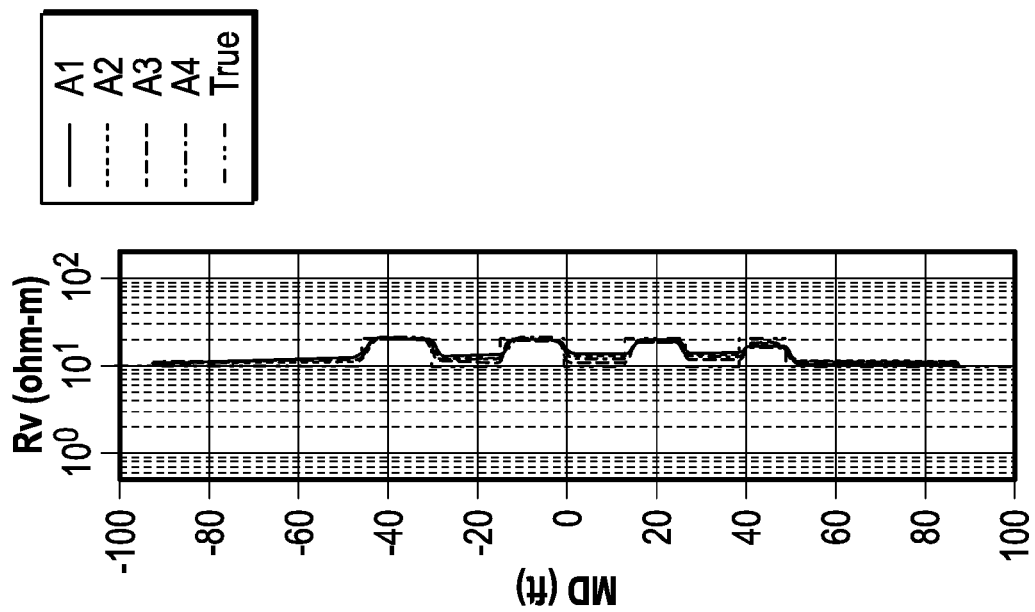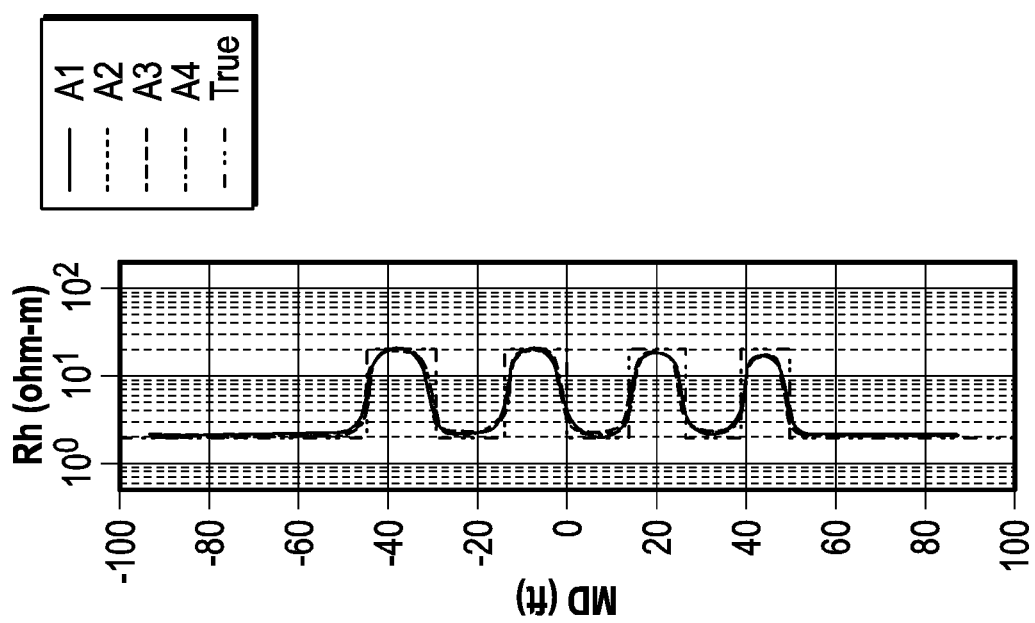
FIG. 10B

MULTIFREQUENCY PROCESSING TO DETERMINE FORMATION PROPERTIES

PRIORITY APPLICATIONS

This application is a U.S. National Stage Filing under 35 U.S.C. 371 from International Application No. PCT/US2013/078070, filed on 27 Dec. 2013, which application is incorporated herein by reference in its entirety.

BACKGROUND

Understanding the structure and properties of geological formations is important for a wide variety of functions in well or reservoir management, monitoring, and remediation. Measurement devices, such as induction logging tools, can make measurements in a borehole or formation (i.e., down hole measurements) to provide data to aid in attaining this understanding.

Induction logging tools utilize electromagnetic signals to make measurements of formation parameters. Some induction logging tools can acquire multi-frequency and multi-array tensor measurements to adapt tool sensitivity based on formation characteristics and to enhance accuracy of delivered logs. On-going efforts continue to improve the speed and efficiency of algorithms for processing of these multi-frequency measurements.

BRIEF DESCRIPTION OF THE DRAWINGS

FIG. 3A illustrates a three-dimensional side view of a radially one-dimensional (R1D) borehole-formation model, in accordance with some embodiments.

FIG. 3B illustrates a two-dimensional top view of an R1D borehole-formation model, in accordance with some embodiments.

FIGS. 5A-5B illustrates an example set of inverted logs in generated at one frequency for purposes of comparison with some embodiments.

FIG. 8A shows a workflow including separate frequency consolidation in accordance with a first embodiment.

FIG. 8B shows a workflow including separate frequency consolidation in accordance with a second embodiment.

FIG. 9A shows a workflow including joint frequency consolidation in accordance with a first embodiment.

FIG. 9B shows a workflow including joint frequency consolidation in accordance with a second embodiment.

FIG. 10A-10B illustrates a set of combination logs of formation parameters generated in accordance with some embodiments.

DETAILED DESCRIPTION

To address some of the challenges described above, as well as others, apparatus, systems and methods are described herein to use a multi-frequency inversion algorithm to process multicomponent induction (MCI) data collected by, for example, an MCI tool. An example of such a tool might include Halliburton's Xaminer™—MCI tool, available from the Halliburton Company of Houston, Tex. This processing can be used to more accurately determine formation properties, direct drilling operations, and control various apparatus and systems.

Figure 1B:
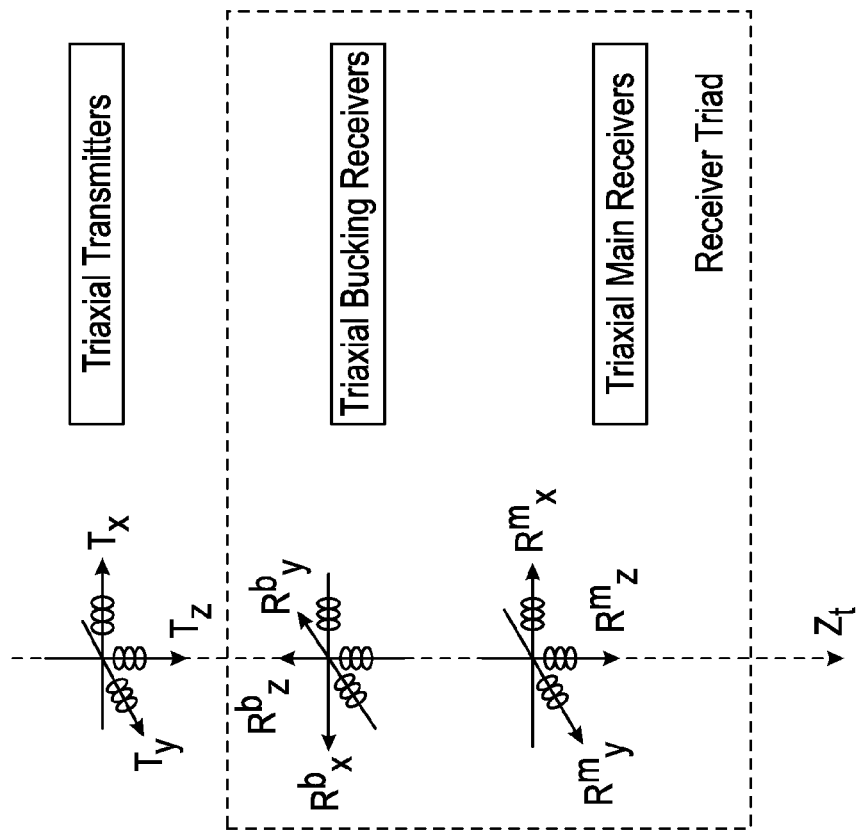
FIG. 1B illustrates a configuration of one subarray of the MCI tool of FIG. 1A, in accordance with some embodiments.
Figure 1A:
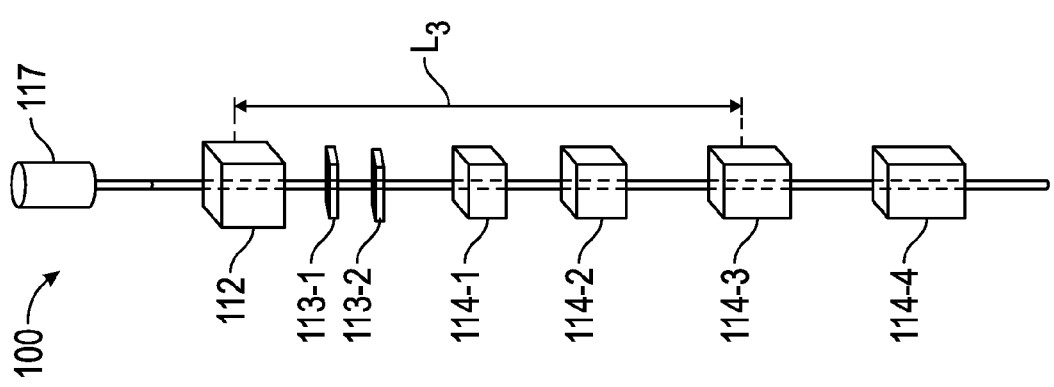
FIG. 1A illustrates an example tool structure of an MCI tool, in accordance with some embodiments.

FIG. 1A illustrates an example tool structure of an MCI tool 100, in accordance with some embodiments. The MCI tool 100 can include a transmitter triad 112, four receiver triads 114-1, 114-2, 114-3, and 114-4, as well as two axial receivers 113-1 and 113-2. Other MCI tools can include transmitter triads, receiver triads, and axial receivers different in number from the numbers shown in FIG. 1A. The axial receivers 113-1 and 113-2 can be located close to the transmitter triad 112. The axial receivers 113-1 and 113-2 may be separated from the transmitter triad 112. For example, one axial receiver 113-1 can be separated from the transmitter triad 112 by about 6 inches and the second axial receiver 113-2 can be separated from the transmitter triad 112 by about 10 inches. FIG. 1A shows the receiver triad 114-3 separated from the transmitter triad 112 by a distance L3. The other receiver triads 114-1, 114-2, and 114-4, may be separated from the transmitter triad 112 by different distances. The MCI tool 100 can include any number of different sets of separation distances.

The MCI tool 100 can include an electronic housing 117. The electronic housing 117 can include a control unit (not shown in FIG. 1A) to selectively activate the transmitter triad 112 and to selectively acquire signals from the receiver triads 114-1, 114-2, 114-3, and 114-4, and the axial receivers 113-1 and 113-2 in response to a probe signal transmitted from the transmitter triad 112. The electronic housing 117 can include a processing unit (not shown in FIG. 1A) to operate on the received signals.

FIG. 1B illustrates a configuration of one subarray of the MCI tool of FIG. 1A, in accordance with some embodiments. The processing unit of the electronic housing 117 can control the subarray to acquire a response at one frequency. FIG. 1B shows an equivalent dipole model of one subarray 114-3 arranged as a triad. The subarray can be structured with triaxial components including the three mutually orthogonal transmitters (Tx, Ty, Tz), the three mutually orthogonal main receivers (Rmx, Rmy, Rmz) and three mutually orthogonal bucking/balancing receivers (Rbx, Rby, Rbz). The receiver triad 114-3 can include the main receivers (Rmx, Rmy, Rmz) along with the bucking/balancing receivers (Rbx, Rby, Rbz). In this example, the transmitters can include co-located transmitter coils, the main receivers can include co-located receiver coils, and the bucking receivers can include co-located receiver coils.

In some embodiments, the processing unit of the electronic housing 117, or other processors or systems described below with respect to FIG. 2, can convert the induction voltage signals measured by the receivers 114-1 through 114-3 and 113-1 through 113-2 into apparent conductivities. The apparent conductivities can be expressed as a 3 by 3 tensor or matrix for four triaxial arrays operated at multiple frequencies, as follows:

$$\overline{\overline{\sigma_a^{(i,j)}}}(z_t) = \begin{pmatrix} \sigma_{xx}^{(i,j)} & \sigma_{xy}^{(i,j)} & \sigma_{xz}^{(i,j)} \\ \sigma_{yx}^{(i,j)} & \sigma_{yy}^{(i,j)} & \sigma_{yz}^{(i,j)} \\ \sigma_{zx}^{(i,j)} & \sigma_{zy}^{(i,j)} & \sigma_{zz}^{(i,j)} \end{pmatrix} = (\sigma_{IJ}^{(i,j)})_{(3\times 3)}, \quad (1a)$$

or $$\overline{\overline{\sigma_a^{(i,j)}}}(z_t) = \begin{pmatrix} XX^{(i,j)} & XY^{(i,j)} & XZ^{(i,j)} \\ YX_{yx}^{(i,j)} & YY_{yy}^{(i,j)} & YZ^{(i,j)} \\ ZX^{(i,j)} & ZY^{(i,j)} & ZZ^{(i,j)} \end{pmatrix} = (IJ^{(i,j)})_{(3\times 3)}, \quad (1b)$$

where:

I,J=x/X,y/Y,z/Z, I indicates the transmitter direction, and J indicates the receiver direction;

i=1, 2, . . . , N, where N is the total number of triaxial arrays;

j=1, 2, . . . , M, where M is the total number of operating frequencies;

$\overline{\overline{\sigma_a^{(i,j)}}}$ is the MCI apparent conductivity tensor (R- or X-signal) in the tool/measurement coordinate system; and $\sigma_{IJ}^{(i,j)}/IJ^{(i,j)}$ are the measured-conductivity couplings of $\overline{\overline{\sigma_a^{(i,j)}}}$.

In some embodiments, there can be 2M×9 signals (M×9 R-signal and M×9 X-signal data) per triaxial subarray for a logging point.

Additionally, axial subarrays (such as axial subarrays 113-1 and 113-2 can measure and transmit signals. For example, in some embodiments with two axial subarrays, 2M signals (M R-signal and M X-signal data) are available from the axial subarrays.

It can be advantageous to use a multiplicity of different frequencies on the same tool under different logging conditions. This type of operation, as described herein, can reduce or eliminate the need for multiple runs or relogs to obtain inversion results for multiple frequency measurements. Among other concerns, multiple runs or relogs may increase processing time and complexity.

Thus, some embodiments provide systems and methods that apply a multi-frequency inversion algorithm to consolidate data obtained at multiple frequencies. Multi-frequency processing, described herein with respect to various embodiments, can enhance accuracy and adaptability of logging systems by generating combination logs that combine the results of different frequency measurements without the use of multiple runs or relogs. Processing time may also be reduced, relative to available systems.

Figure 2:
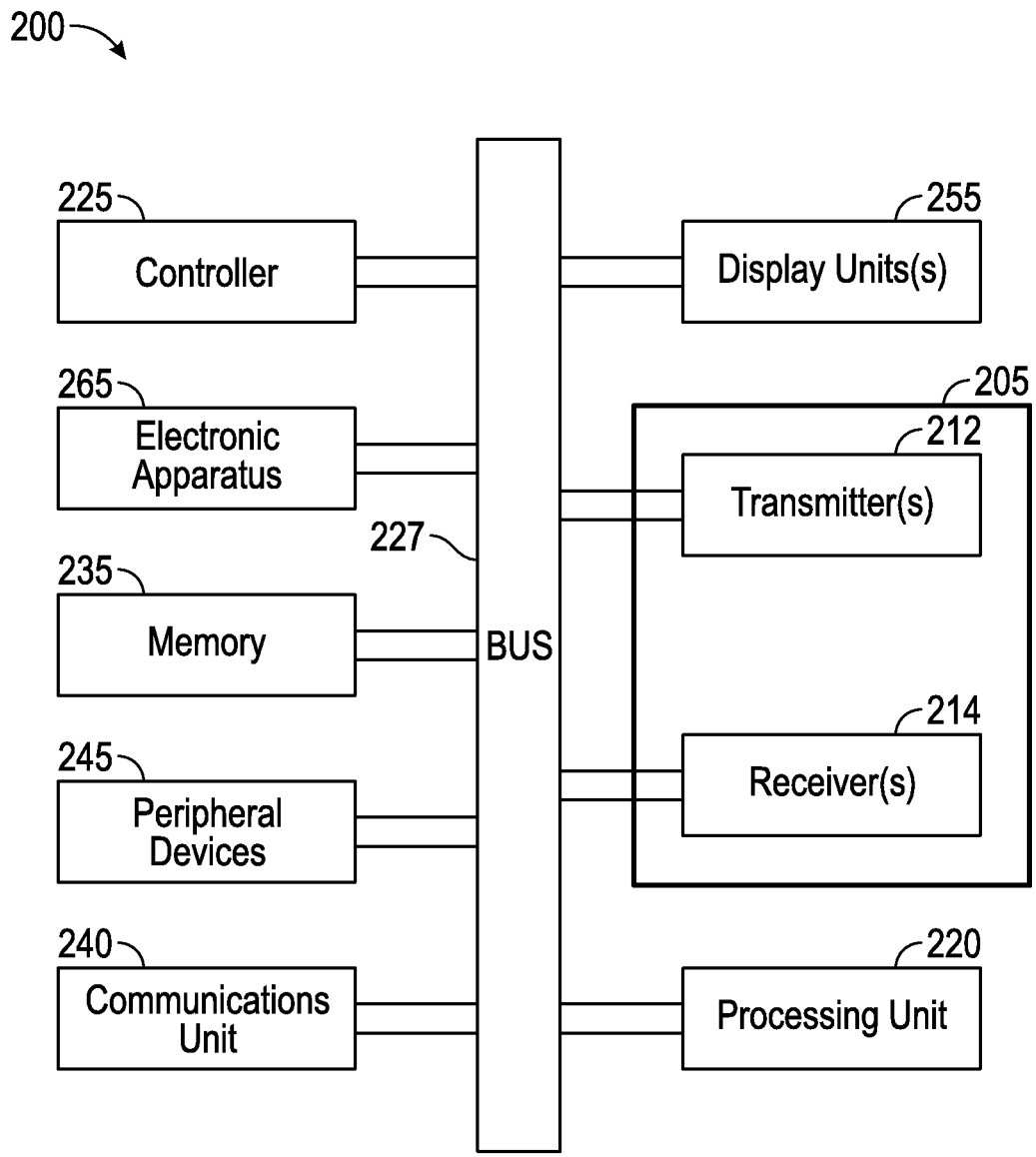
FIG. 2 depicts a block diagram of features of a logging system in accordance with various embodiments.

FIG. 2 depicts a block diagram of features of a logging system 200 in accordance with various embodiments. The logging system 200 can provide multi-frequency processing as described below. The logging system 200 includes an induction tool 205 having an arrangement of transmitter antenna(s) 212 and receiver antenna(s) 214 operable in a wellbore. The arrangements of the transmitter antenna(s) 212 and the receiver antenna(s) 214 of the induction tool 205 can be realized similar to or identical to the various arrangements discussed herein. For example, the induction tool 205 can propagate energy at a plurality of frequencies into a formation. The induction tool 205 can provide a plurality of measurements of a formation parameter responsive to the propagated energy. The induction tool 205 can include an MCI tool as described above with respect to FIGS. 1A and 1B. As described above, the induction tool 205 can include a multiaxial tool that includes a plurality of multiaxial subarrays. The induction tool 205 can operate at three or more frequencies.

The processing unit 220 can couple to the induction tool 205 to obtain measurements from the induction tool 205. The processing unit 220 can perform operations to manage processing schemes implementing a multi-frequency inversion scheme for multicomponent induction log data as will be described in more detail below.

In the multi-frequency inversion of some embodiments, the processing unit 220 can obtain enhanced signals by combining nine couplings of $\overline{\overline{\sigma_a^{(i,j)}}}$ using linear or nonlinear transformations. As an illustrative example, the processing unit 220 can obtain enhanced signals using the following linear transformation from three direct couplings $\sigma_{xx}^{(ij)}$, $\sigma_{yy}^{(ij)}$, and $\sigma_{zz}^{(ij)}$:

$$\sigma_{dc}^{(ij)} = a^{(ij)} \cdot \sigma_{zz}^{(ij)} + b^{(ij)} \cdot \sigma_{xx}^{(ij)} + c^{(ij)} \cdot \sigma_{yy}^{(ij)}, \quad (2)$$

where $\sigma_{dc}^{(ij)}$ are the direct-coupling enhanced signals obtained from the induction tool 205, the three coefficients $a^{(ij)}$, $b^{(ij)}$ and $c^{(ij)}$ are the constants for fixed array and frequency, and generally $a^{(ij)} + b^{(ij)} + c^{(ij)} = 1$.

From the cross-couplings $\sigma_{IJ}^{(ij)}$ and $\sigma_{JI}^{(ij)}$ (I≠J) of $\overline{\overline{\sigma_a^{(ij)}}}$, the processing unit 220 can calculate enhanced signals using the following linear transformation:

$$\sigma_{cc}^{(ij)} = d^{(ij)} \cdot \sigma_{IJ}^{(ij)} + e^{(ij)} \cdot \sigma_{JI}^{(ij)}, \quad (3)$$

where:

$\sigma_{cc}^{(ij)}$ are cross-coupling enhanced signals;

the two coefficients $d^{(ij)}$ and $e^{(ij)}$ are constants for fixed array and frequency;

and $0 \le d^{(ij)} + e^{(ij)} \le 1.0$

Use of the above-described enhanced signals can provide improvements relative to non-enhanced signals, including for example improved vertical resolution. However, various embodiments are not limited to use of enhanced signals.

FIG. 3A illustrates a three-dimensional side view of a radially one-dimensional (R1D) borehole-formation model, in accordance with some embodiments, and FIG. 3B illustrates a two-dimensional top view of the R1D borehole-formation model, in accordance with some embodiments. Multi-frequency inversion, described below with respect to FIGS. 4 and 6, can be based on the R1D model of FIGS. 3A and 3B.

Referring to FIG. 3A, the R1D model can include a borehole 310 with a circular cross section surrounded by a homogenous formation 320 of infinite thickness. The borehole 310 may be vertical or deviated, and the MCI tool 300 can be centralized or decentralized in the borehole 310. Formation 320 resistivity/conductivity can be isotropic or anisotropic. For a given subarray (described above with respect to FIGS. 1A and 1B) operated at a given frequency, apparent conductivity measured by the MCI tool 300 can depend on various formation 320 parameters, as well as other characteristics of the MCI tool 300, borehole 310, or formation 320. Such parameters can include, for example, formation 320 horizontal resistivity or vertical resistivity, formation 320 or borehole 310 azimuth, borehole 310 diameter, borehole 310 mud resistivity, MCI tool 300 eccentricity, and dip 330.

FIG. 3B illustrates a two-dimensional top view of an R1D borehole-formation model, in accordance with some embodiments. As shown in FIG. 3B, the MCI tool 300 can have a strike/azimuthal angle ($\varphi_s$).

Figure 4:
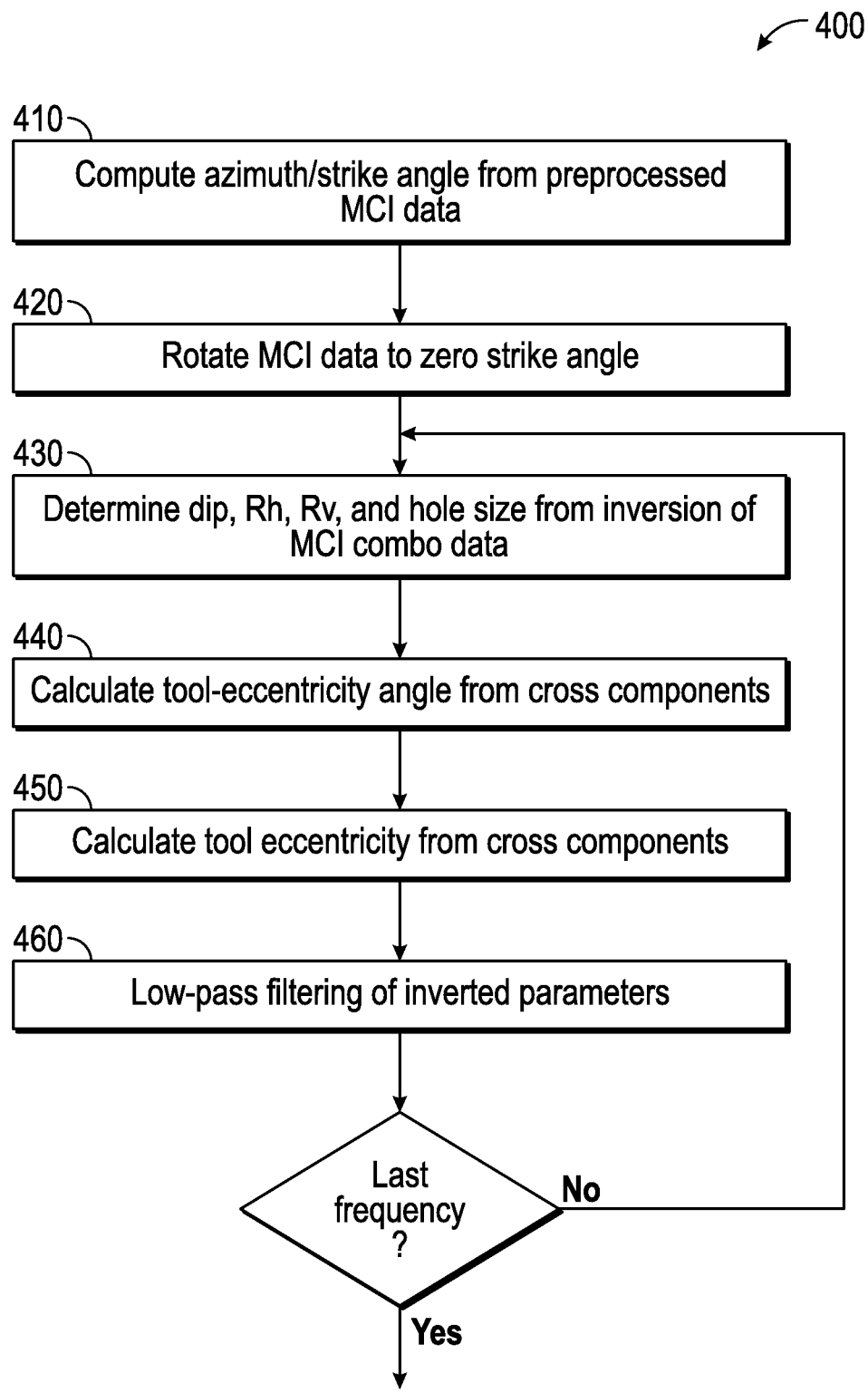
FIG. 4 illustrates a workflow to perform single-frequency inversion of MCI data in accordance with some embodiments.

FIG. 4 illustrates an example workflow 400 to perform single-frequency inversion of MCI data in accordance with some embodiments. The workflow 400 may implement multi-frequency inversion by inverting each frequency separately, based on the R1D forward model described above with respect to FIGS. 3A and 3B. Inversion processing of data to determine formation parameters can be performed according to a modeling approach for the formation. Inversion operations can include a comparison of measurements to predictions of a model such that a value or spatial variation of a physical property can be determined. In inversion, measured data may be applied to construct a model that is consistent with the data. For an examination process, an inversion operation can include determining a variation of electrical conductivity (resistivity) in a formation from measurements of induced electric and magnetic fields.

Other techniques, such as forward modeling, deal with calculating expected observed values with respect to an assumed model. In one-dimensional (1D) modeling, there is variation in one direction such as a formation of parallel layers.

In general, a coordinate system in which the above dimensions are defined can be Cartesian or cylindrical. In borehole applications, a cylindrical coordinate system is often used.

In some embodiments, the processing unit 220 (FIG. 2) can perform one or more portions of the workflow 400, although various embodiments are not limited thereto. At block 410, the processing unit 220 computes the strike/azimuthal angle ($\varphi_s$) from pre-processed MCI data. The pre-processed MCI data can include MCI cross-component data of long-spacing subarrays at low frequencies in the tool coordinate system. At block 420, the processing unit 220 obtains MCI data in the strike system by rotating MCI data in the tool system to zero-strike angle. At block 430, the processing unit 220 determines dip, Rh, Rv, and hole size from inversion of MCI enhanced signals.

At block 440, the processing unit 220 calculates the tool eccentricity angle. The processing unit 220 may calculate the tool eccentric angle from the short-spacing and high-frequency, cross-component data in the strike system. At block 450, the processing unit 220 calculates tool eccentricity data, for example a distance from the borehole center to the center of the MCI tool 300 (FIGS. 3A and 3B), from cross-components in the strike system. At block 460, the processing unit 220 performs low-pass filtering of inverted parameters to, for example, reduce or eliminate spikes in the calculated parameters.

The processing unit 220 can perform at least some of the described functionality in the workflow 400 for each operating frequency for subarrays of the induction tool 205. The workflow 400 may therefore produce inverted logs of Rh, Rv, dip, and strike/azimuth for multiple arrays and frequencies.

Figure 5A:
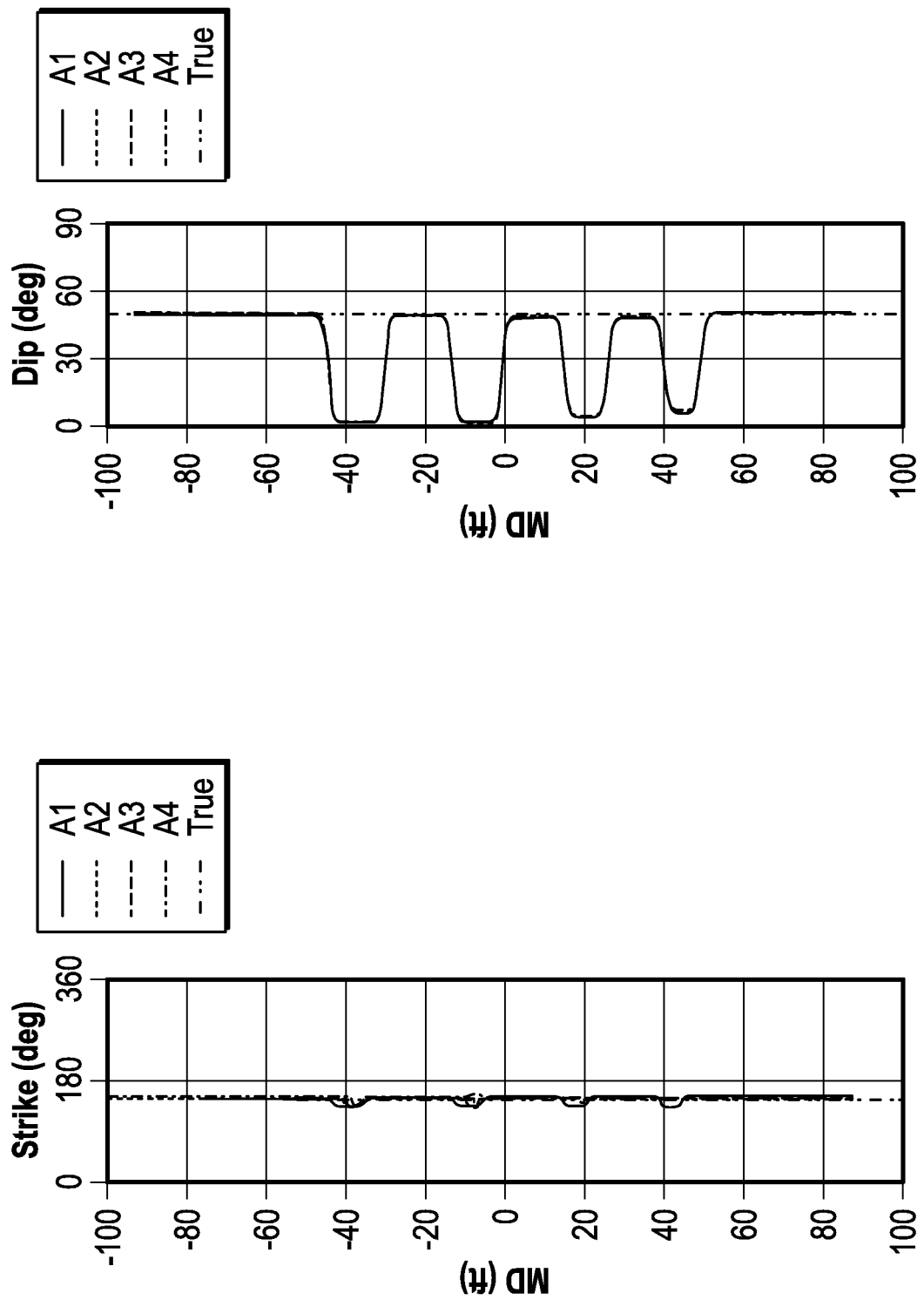

FIGS. 5A-5B illustrate an example set of inverted logs generated at one frequency for purposes of comparison with some embodiments. FIGS. 5A-5B show inverted logs, such as logs produced by the process of workflow 400, for four formation parameters (strike, dip, horizontal resistivity, and vertical resistivity). The processing unit 220 can use inverted logs with the workflow 600, described below with respect to FIG. 6.

Figure 6:
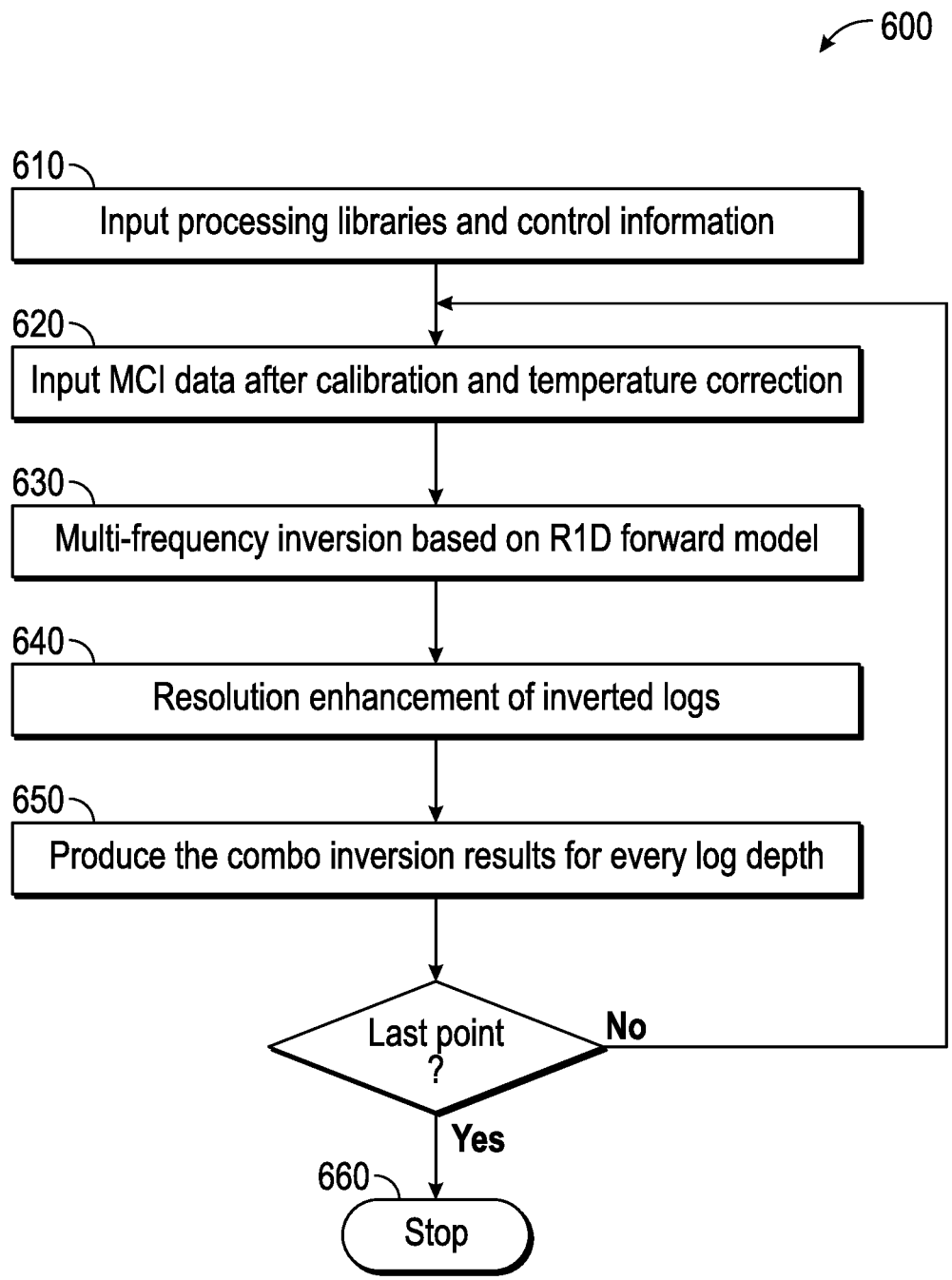
FIG. 6 illustrates a workflow to consolidate multi-frequency inversion results, in accordance with some embodiments.

FIG. 6 illustrates a workflow 600 to consolidate multi-frequency inversion results, in accordance with some embodiments. The workflow 600 illustrated in FIG. 6 consolidates inversion results from multiple frequencies to obtain a more accurate result. The processing unit 220 can perform consolidation of results at any stage and such consolidation can result in removal of frequency as a parameter of a measurement. On the other hand, enhanced signals are generated by combining couplings as described above with respect to Equation (2)-(3). Enhanced signals permit greater vertical resolution, and reduced/enhanced tool eccentricity/angle effects on MCI logs etc. However, embodiments are not limited to consolidating inversion results, and some embodiments can apply consolidation to raw or processed measurements before the inversion. Some other embodiments can apply consolidation as part of a multi-frequency inversion operation.

Referring now to FIGS. 2 and 6, it can be seen that at block 610, the processing unit 220 receives a processing library and control information to use for processing. For example, a processing library can include a prebuilt library or lookup table that includes a description of the response of the tool to the various formation parameters.

At block 620, the processing unit 220 receives MCI data after calibration and temperature correction. Temperature correction may be applied to compensate for temperature effects on the sonde and electronics. Calibration may be used to convert measured voltages into conductivity signals for ensuing processing.

At block 630, the processing unit 220 produces multi-frequency inverted logs of Rh, Rv, dip, and strike/azimuth for multiple arrays and frequencies. The processing unit 220 can produce these inverted logs as described with respect to the workflow 400 (FIG. 4). At block 640, the processing unit 220 performs resolution enhancement of inverted logs by combining signals into enhanced signals as described above with respect to FIGS. 1A and 1B.

At block 650, the processing unit 220 can use the following transformation to produce combo-inversion results:

$$X^{(i)} = \sum_{j=1}^{M} W_{ij} \cdot X^{(ij)}, i = 1, 2, \ldots, N \tag{4}$$

where i and j are the triaxial subarray and operated frequency indexes,

N is number of subarrays in the induction tool,

M is the number of operating frequencies used in the induction tool, $X^{(i)}$ are combo-inverted parameters $dip^{(i)}$, $str^{(i)}/azi^{(i)}$, $Rh^{(i)}$, or $Rv^{(i)}$ for the i-th subarray after combining the 5-frequency inverted results, $X^{(ij)}$ are inverted parameters $dip^{(ij)}$, $str^{(ij)}/azi^{(ij)}$, $Rh^{(ij)}$, or $Rv^{(ij)}$ results for a given i-th subarray operated at the j-th frequency; and $W_{ij}$ is a weight function.

The weight function $W_{ij}$ can depend on multiple independent variables such as formation dip, strike/azimuth, Rh, and Rv and can be expressed using the notation $W_{ij}=W_{ij}(Rh, dip, Rv, \ldots)$ where $0 \leq W_{ij} \leq 1$ and $$\sum_{j=1}^{M} W_{ij} = 1, i = 1, 2, \ldots, N.$$

In some embodiments, the effect from other factors are ignored, and only variable Rh is considered, to allow a simplified form $W_{ij}=W_{ij}(Rh)$, can be expressed as a piecewise function with five pieces for given i and j indexes:

$$W_{ij} = W_{ij}(Rh) = \begin{cases} 0 & Rh \le R_1^{(i,j)} \\ f_1^{(i,j)}(Rh) & R_1^{(i,j)} < Rh \le R_2^{(i,j)} \\ 1 & R_2^{(i,j)} < Rh \le R_3^{(i,j)} \\ f_2^{(i,j)}(Rh) & R_3^{(i,j)} < Rh \le R_4^{(i,j)} \\ 0 & Rh > R_4^{(i,j)} \end{cases} \quad (5)$$

where $f_1^{(ij)}$ (Rh) and $f_2^{(ij)}$ (Rh) are two undetermined linear or nonlinear functions.

In some embodiments, the linear functions $f_1^{(ij)}$ and $f_2^{(ij)}$ can be expressed in slope-intercept form:
$f_1^{(ij)}(Rh)=k_1^{(ij)} \cdot Rh+b_1^{(ij)}$ and $f_2^{(ij)}(Rh)=k_2^{(ij)} \cdot Rh+b_2^{(ij)}$. Based on the values of $W_{ij}$ and Rh, the processing unit 220 can determine corresponding slopes and y-axis intercepts for the linear functions $f_1^{(ij)}$ and $f_2^{(ij)}$.

In embodiments described herein, $R_1^{(ij)}$, $R_2^{(ij)}$, $R_3^{(ij)}$ and $R_4^{(ij)}$ satisfy the inequality $R_1^{(ij)} \le R_2^{(ij)} \le R_3^{(ij)} \le R_4^{(ij)}$ and the processing unit 220 may determine their values by solving the following constrained optimization problem:

$$\begin{cases} \min\left(\sum_{i=1}^{N-1} |X^{(i)} - X^{(i+1)}|\right) \\ R_i^{(i,j)} \le R_2^{(i,j)} \le R_3^{(i,j)} \le R_4^{(i,j)} \end{cases} \quad (6)$$

In other embodiments, the processing unit 220 or other processor or system can determine $R_1^{(ij)}$, $R_2^{(ij)}$, $R_3^{(ij)}$ and $R_4^{(ij)}$ by conducting a number of numerical or real data processing experiments. Based on estimates or experimental values of $R_1^{(ij)}$, $R_2^{(ij)}$, $R_3^{(ij)}$ and $R_4^{(ij)}$, the processing unit 220 can determine the weights or weight functions to be assigned to different operating frequencies for each subarray. Therefore, the processing unit 220 can process measurements over multiple frequencies, for example each operating frequency of the induction tool 205, to obtain estimated values of formation parameters.

Figures 7A, 7B:
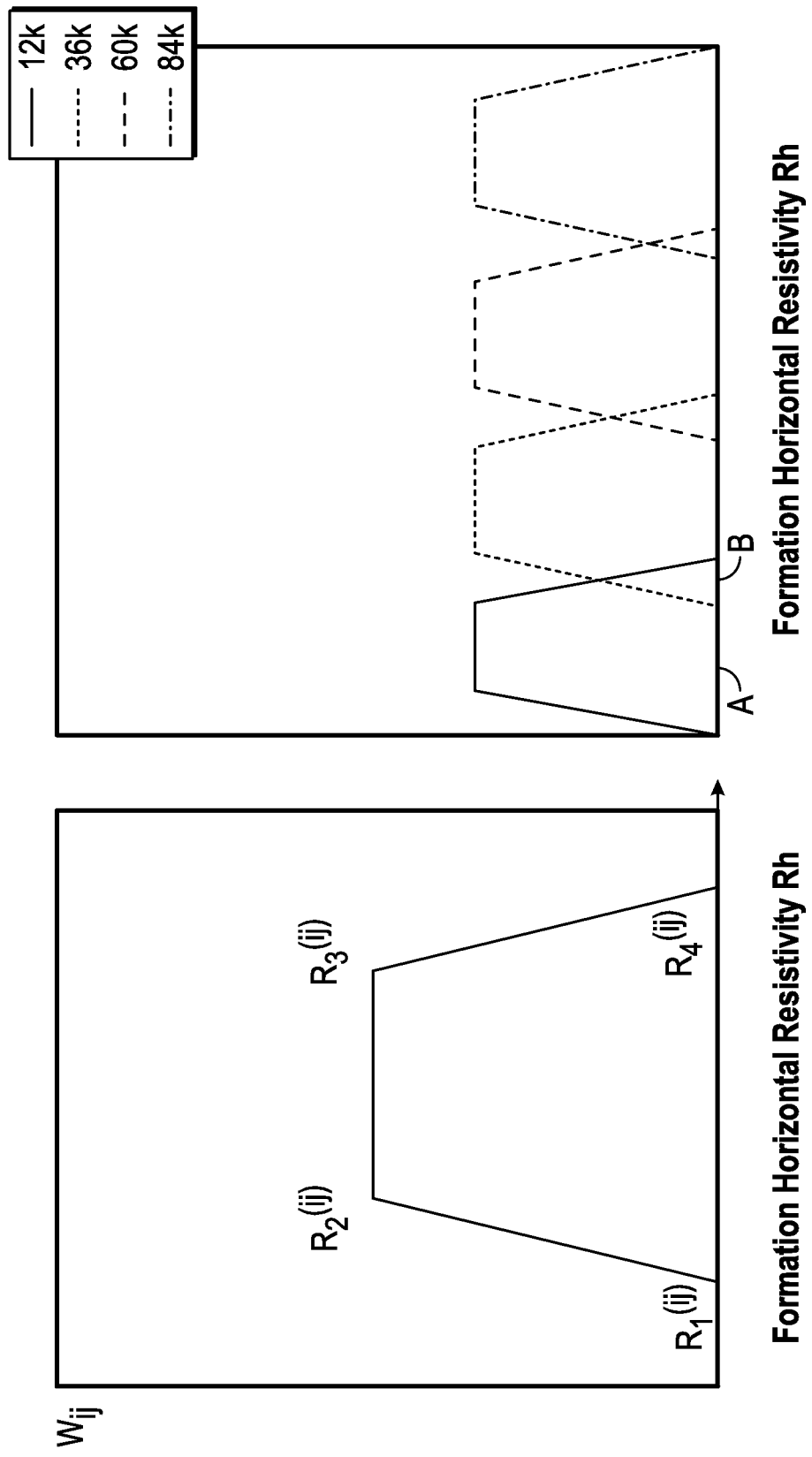
FIG. 7A illustrates an example weight function for a given array and frequency in accordance with some embodiments.
FIG. 7B illustrates weight functions at each operating frequency for the given array in accordance with some embodiments.

FIGS. 7A and 7B are a visual representation of piecewise function (5). FIG. 7A illustrates an example weight function for a given array i and frequency j in accordance with some embodiments. FIG. 7B illustrates weight functions for a given array, at each operating frequency for the given array, in accordance with some embodiments.

As an illustrative example, if an experimental or other value for Rh falls at point A, the processing unit 220 selects the measurement taken at that array at the 12 kHz operating frequency as the true measurement, such that the processing unit 220 assigns a weight of "1" to that measurement while the processing unit 220 assigns "0" to other measurements. Accordingly, a weighted sum of measurements for the given array according to Equation (4) will include a value for the 12 kHz operating frequency (but not for other operating frequencies) of the array because weights for the other operating frequencies will be zero. On the other hand, if an experimental value or other value for Rh falls at point B, the measurements taken at 12 kHz and 36 kHz can each be taken into account with weights according to functions $f_1^{(ij)}$ and $f_2^{(ij)}$. The 60 kHz and 84 kHz measurements will not be taken into account, since the weights assigned to those measurements will be zero—the value of Rh at point B is less than $R_1^{(ij)}$ for either of those two frequencies.

Embodiments are not limited to the order of operations described above with respect to workflow 400 (FIG. 4) and workflow 600 (FIG. 6). Rather, operations in either workflow can occur serially, in parallel, repeatedly, in combination with each other, and in any order, to be limited only by the claims at the end of this description.

In this regard, FIGS. 8A through 8D show embodiments in which the processing unit 220 (FIG. 2) performs frequency consolidation operations separate from other operations. FIGS. 9A-9B show embodiments in which the processing unit 220 performs frequency consolidation operations in combination with other operations. The processing unit 220 can apply frequency consolidation in some embodiments, as described above with respect to FIGS. 6, 7A, and 7B and Equations (4)-(6), to combine measurements of formation parameters taken using multiple operating frequencies of an induction tool 205.

Referring to FIG. 8A, in an embodiment, the processing unit 220 applies frequency consolidation, before enhancement, on the corrected signal. At block 8022, the processing unit 220 receives raw signals $R^{(ij)}(i_f, i_s, i_d)$, from one or more subarrays i at one or more operating frequencies j, where $i_f$ is a frequency index, $i_f=1, \ldots M$; $i_s$ is the spacing index, $i_s=1, \ldots N$; and $i_d$ is the depth index, $i_d=1, \ldots N_d$, ($N_d$=number of depths of investigation). The processing unit 220 performs temperature correction and calibration, as described above with respect to block 620 (FIG. 6), to generate conductivity signals $\sigma_a^{(ij)}(i_f, i_s, i_d)$ that can represent calibrated resistivity responses.

At block 804, the processing unit 220 performs frequency consolidation to consolidate conductivity signals at the different frequencies into a single conductivity signal at each logging depth. At block 806, the processing unit 220 performs signal enhancement by combining different couplings as described above with respect to FIG. 1B and Equations (2)-(3). At block 808, the processing unit 220 performs R1D inversion to obtain inversion logs of at least some formation parameters, including horizontal conductivity $\sigma_h(i_s, i_d)$, vertical conductivity $\sigma_v(i_s, i_d)$, dip angle $\theta(i_s, i_d)$ and strike angle $\varphi(i_s, i_d)$. At block 810, the processing unit 220 performs vertically one-dimensional (V1D) inversion to obtain $\sigma_h(i_s, i_d)$, $\sigma_v(i_s, i_d)$, $\theta(i_s, i_d)$ $\varphi(i_s, i_d)$, and additionally layer boundary position $z(i_s, i_l)$, where $i_l$ is a layer index, $i_l=1 \ldots N_l$ ($N_l$=the number of layers).

In an embodiment illustrated by FIG. 8B, the processing unit 220 performs substantially similar operations as those discussed above with respect to FIG. 8A, except that frequency consolidation is applied before R1D inversion on the enhanced signal.

Figure 8C:
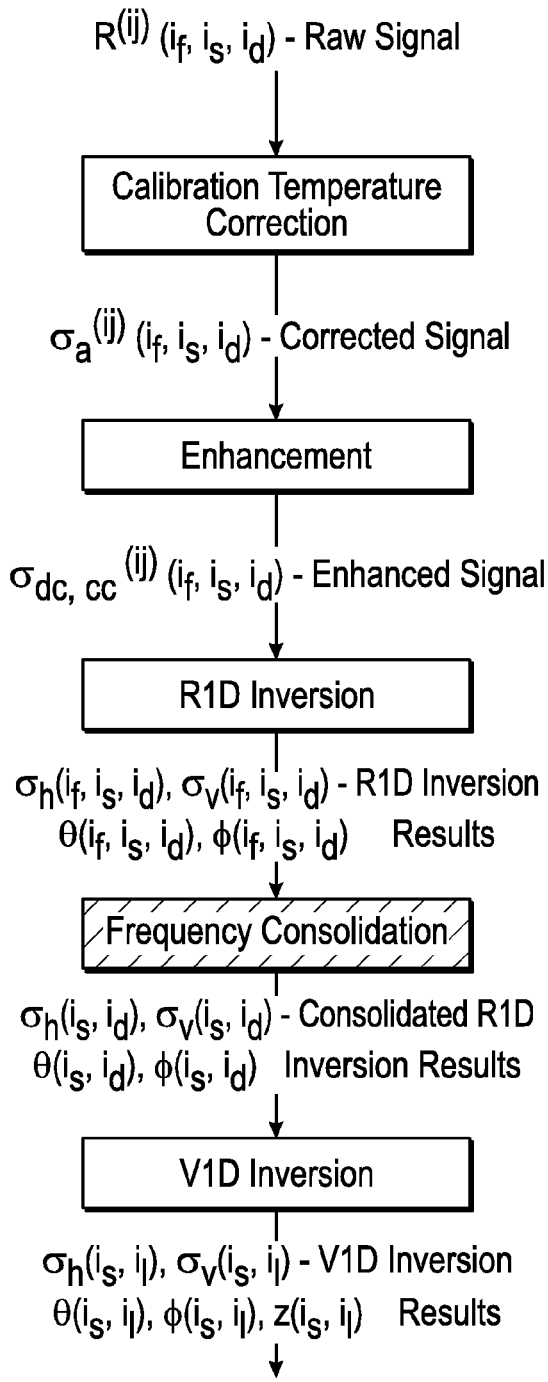
FIG. 8C shows a workflow including separate frequency consolidation in accordance with a third embodiment.

In an embodiment illustrated by FIG. 8C, the processing unit 220 performs substantially similar operations as those discussed above with respect to FIG. 8A, except that the processing unit 220 applies frequency consolidation before V1D inversion on the R1D inversion results.

Figure 8D:
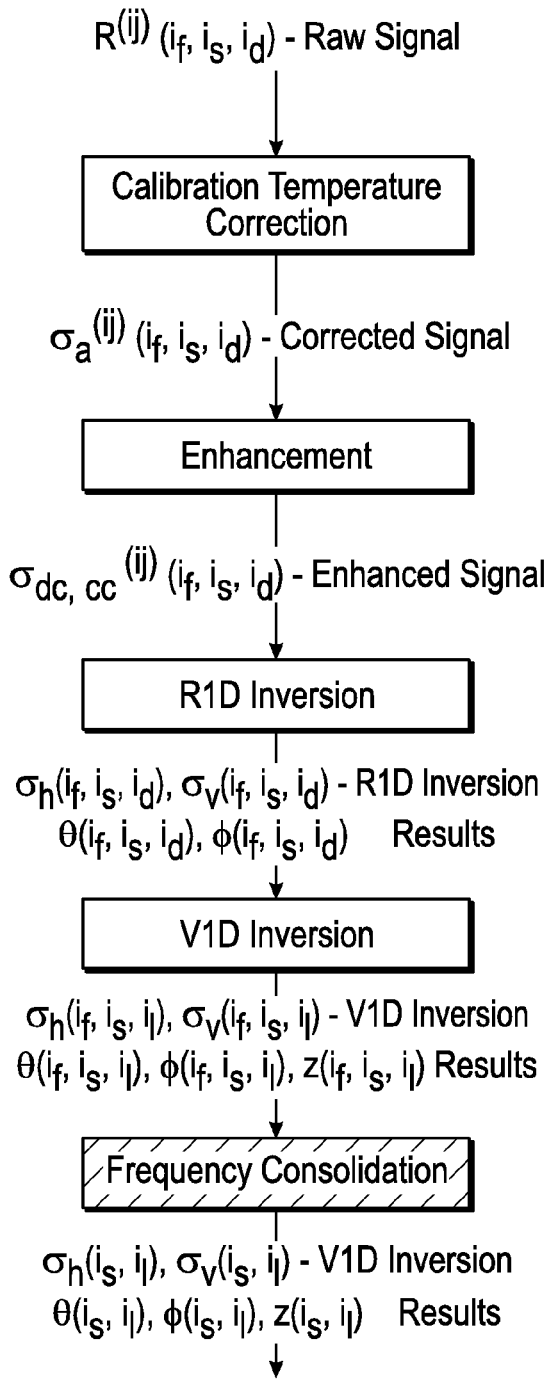
FIG. 8D shows a workflow including separate frequency consolidation in accordance with a fourth embodiment.
Figure 11:
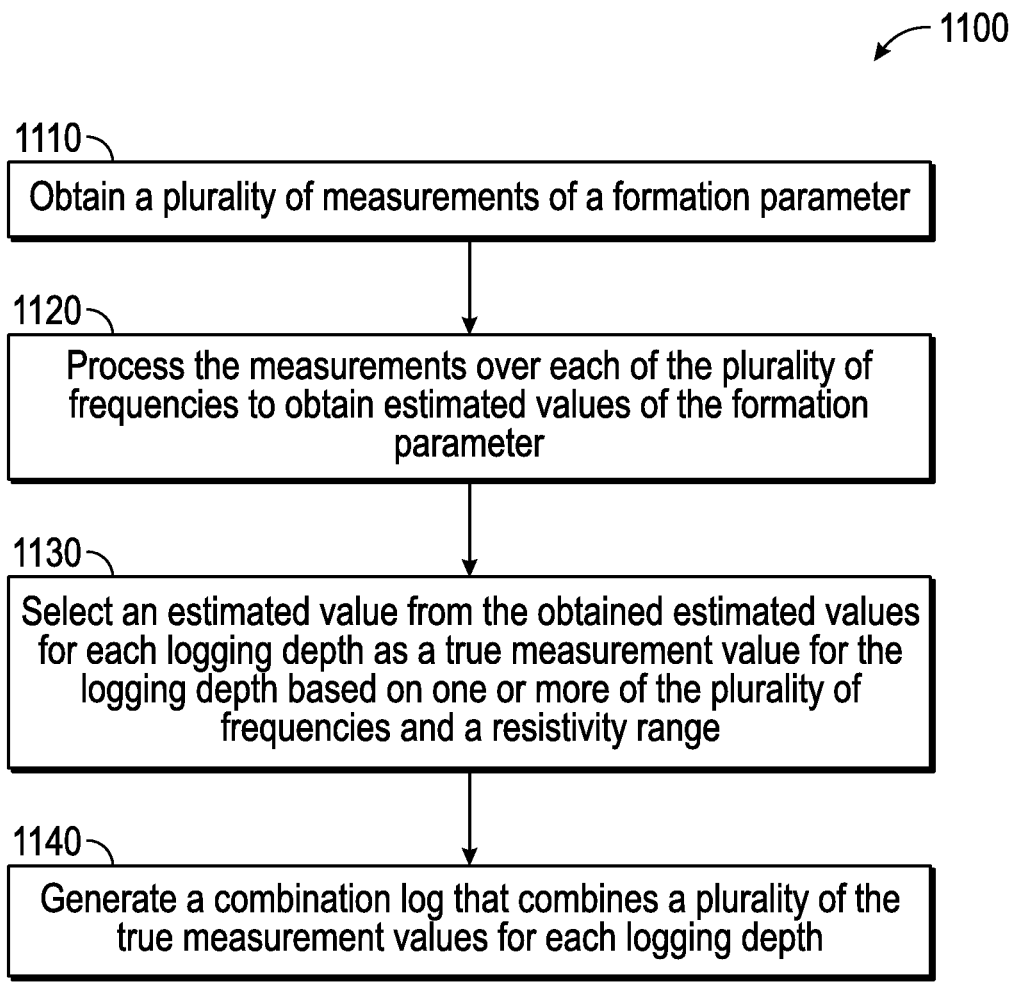
FIG. 11 is a flowchart illustrating a method of measuring a formation property in accordance with some embodiments.

In an embodiment illustrated by FIG. 8D, the processing unit 220 performs substantially similar operations as those discussed above with respect to FIG. 8A, except that the processing unit 220 applies frequency consolidation after V1D inversion, on the V1D inversion results. The processing unit 220 may also use weights, determined in frequency consolidation operations and as described above with respect to FIGS. 7A and 7B and equations (4)-(6) and embodiments illustrated in FIGS. 8C and 8D, in frequency consolidation operations in subsequent application of embodiments illustrated in FIGS. 8A and 8B.

FIGS. 9A and 9B illustrate embodiments in which the processing unit 220 applies frequency consolidation as part of R1D inversion (FIG. 9A), or as a part of V1D inversion (FIG. 9B). At FIG. 9A, block 902, the processing unit 220 can apply joint inversion and frequency consolidation to calibrated conductivity/resistivity responses. Alternatively, in FIG. 9B block 904, the processing unit 220 can apply joint inversion and frequency consolidation to a radially inverted version of a formation parameter. The radially inverted version of the formation parameter can include a radially inverted resistivity value, a radially inverted dip value, or a radially inverted strike value, among others.

In at least the embodiments illustrated in FIGS. 9A and 9B, the processing unit 220 can include frequency consolidation as a part of the respective inversion function by defining a cost function in the inversion as a function of multiple frequencies with different weights. The processing unit 220 can choose the different weights as described above with respect to FIGS. 7A and 7B and Equations (4)-(6). Other operations shown in FIGS. 9A and 9B can proceed similarly to operations described above with respect to FIGS. 8A-8D.

In embodiments described above with respect to FIGS. 8A-8D and 9A-9B, the processing unit 220 generates combination logs, which can include data from more than one frequency, of various formation parameters based on measurements taken at multiple frequencies. An inverted log representing data of only one frequency was illustrated and described above with respect to FIG. 5.

FIGS. 10A-10B illustrate a set of combination logs of formation parameters that the processing unit 220 generated in accordance with some embodiments. The illustrative example of FIGS. 10A-10B shows a set of combination logs, using synthetic data, of strike, dip, and horizontal and vertical resistivity for four triaxial subarrays A1-A4. As can be seen by comparing FIGS. 10A-10B with FIGS. 5A-5B, logs generated during a single logging run according to various embodiments can be at least as accurate as logs using other methods, without using multiple logging runs (as occurs with some other methods).

Referring again to FIG. 2, the logging system 200 can additionally include a controller 225, a memory 235, an electronic apparatus 265, and a communications unit 240. The controller 225 and the memory 235 can be fabricated programmed to operate the induction tool 205 to acquire measurement data as the induction tool 205 is operated. The controller 225 and the memory 235 can be fabricated or programmed to control activation of selected ones of the transmitter antennas 212 and data acquisition by selected one of the receiver antennas 214 in the induction tool 205 and to manage processing schemes with respect to data derivable from measurements using the induction tool 205 as described herein. The memory 235 can store measurements of formation parameters such that operating frequencies used for taken a particular measurement are associated with that measurement. The memory 235 therefore may include a database, for example a relational database.

Electronic apparatus 265 can be used in conjunction with the controller 225 to perform tasks associated with taking measurements downhole with the transmitter antenna(s) 214 and the receiver antenna(s) 212 of the induction tool 205. The communications unit 240 can include downhole communications in a drilling operation. Such downhole communications can include a telemetry system.

The logging system 200 can also include a bus 227, where the bus 227 provides electrical conductivity among the components of the logging system 200. The bus 227 can include an address bus, a data bus, and a control bus, each independently configured. The bus 227 can also use common conductive lines for providing one or more of address, data, or control, the use of which can be regulated by the controller 225. The bus 227 can include instrumentality for a communication network. The bus 227 can be configured such that the components of the logging system 200 are distributed. Such distribution can be arranged between downhole components such as the transmitter antenna(s) 212 and the receiver antenna(s) 214 of the induction tool 205 and components that can be disposed on the surface of a well. Alternatively, various of these components can be co-located such as on one or more collars of a drill string or on a wireline structure.

In various embodiments, the logging system 200 includes peripheral devices 245 that can include displays, additional storage memory, or other control devices that may operate in conjunction with the controller 225 or the memory 235. The display can display combination logs, which the processing unit 220 generated according to embodiments described above.

In an embodiment, the controller 225 can be realized as one or more processors. The peripheral devices 245 can be arranged to operate in conjunction with display unit(s) 255 with instructions stored in the memory 235 to implement a user interface to manage the operation of the induction tool 205 or components distributed within the logging system 200. Such a user interface can be operated in conjunction with the communications unit 240 and the bus 227. Various components of the logging system 200 can be integrated with the induction tool 205 such that processing identical to or similar to the processing schemes discussed with respect to various embodiments herein can be performed downhole.

In various embodiments, a non-transitory machine-readable storage device can comprise instructions stored thereon, which, when performed by a machine, cause the machine to perform operations, the operations comprising one or more features similar to or identical to features of methods and techniques described herein. A machine-readable storage device, herein, is a physical device that stores data represented by physical structure within the device. Examples of machine-readable storage devices can include, but are not limited to, memory 235 in the form of read only memory (ROM), random access memory (RAM), a magnetic disk storage device, an optical storage device, a flash memory, and other electronic, magnetic, or optical memory devices, including combinations thereof.

The physical structure of such instructions may be operated on by one or more processors such as, for example, the processing unit 220. Executing these physical structures can cause the machine to perform operations to obtain a plurality of measurements of a formation parameter; to process the measurements over each of the plurality of frequencies to obtain estimated values of the formation parameter; to select an estimated value from the estimated values for each logging depth as a true measurement value for the logging depth based on one or more of the plurality of frequencies and a resistivity range; and to generate a combination log that combines a plurality of the true measurement values for each logging depth.

The instructions can include instructions to cause the processing unit 220 to generate the combination log by generating a weighted sum of the plurality of true measurement values based on a piecewise function, wherein each of a plurality of subfunctions of the piecewise function corresponding to a range of parameter values. Estimated values can undergo temperature correction or calibration as described above such that estimated values include a temperature-corrected resistivity value, a calibrated resistivity value, or any combination thereof. Estimated values can also undergo enhancement as described above to generate an enhanced apparent resistivity value. The enhanced apparent resistivity value can be generated based on a mathematical transformation of combinations of apparent resistivity values.

The instructions can include instructions to cause the processing unit 220 to perform any of, or a portion of, the above-described operations in parallel with performance of any other portion of the above-described operations. For example, the processing unit 220 can use parallelization techniques, such as Open Multi-Processing (OpenMP), to spawn multiple processor threads to perform any operation or portion of an operation. These processor threads can execute in parallel with each other to reduce processing time for generating combination logs in some embodiments. As a nonlimiting example, an inversion operation of one formation parameter can occur in parallel with inversion operations of another formation parameter, or a signal enhancement can occur in parallel with a frequency consolidation operation.

The processing unit 220 can store, in memory 235, any or all of the plurality of measurements of a formation parameter taken at any or all of the plurality of frequencies. The processing unit 220 can store these measurements in a database, for example a relational database in memory 235, such that measurements are associated with the corresponding frequencies.

The instructions can include instructions to cause the processing unit 220 to store any other associated data, such as intermediate calculations, such that data is associated with the corresponding frequencies. If the processing unit 220 receives an indication of an error condition related to a corresponding frequency, the processing unit 220 can disregard measurements associated with that frequency in subsequent operations. As a non-limiting example, the processing unit 220 can receive an indication that there is a hardware failure of hardware associated with one of the operating frequencies. Upon receiving notification of such a hardware failure, the processing unit 220 can omit or disregard any data associated with the failed hardware or the corresponding operating frequency.

FIG. 22 is a flowchart illustrating a method 1100 of measuring a formation property in accordance with some embodiments. The processing unit 220 can implement operations of method 1100, although embodiments are not limited thereto.

Example method 1100 starts at block 1110 with obtaining a plurality of measurements of a formation parameter. The processing unit 220 can obtain each measurement can be obtained in response to energy propagated into the formation at a frequency of a plurality of frequencies of propagated energy. A tool, for example induction tool 205 including a plurality of triaxial subarrays as described above, can propagate the energy.

Example method 1100 continues at block 1120 with processing the measurements over each of a plurality of frequencies to obtain estimated values of the formation parameter, for example estimated values as described above with respect to FIG. 6. The plurality of frequencies can include at least three frequencies. The formation parameter or estimated values of the formation parameter can include a radially inverted formation parameter or estimated value. The radially inverted formation parameter or estimated value can include a radially inverted resistivity parameter or estimated value, a radially inverted dip parameter or estimated value, or a radially inverted strike parameter, among others.

Example method 1100 continues at block 1130 with selecting an estimated value from the obtained estimated values for each logging depth as a true measurement value for the logging depth. Estimated values can further undergo temperature correction or calibration to generate a temperature-corrected value, a calibrated resistivity value, or a combination thereof. Estimated values can also undergo include an enhanced apparent resistivity value. The processing unit 220 can generate the enhanced apparent resistivity value based on a mathematical transformation of combinations of apparent resistivity values. The processing unit 220 can perform the selecting based on one or more of the plurality of frequencies and a resistivity range as described above with respect to FIGS. 7A and 7B.

Example method 2200 continues at block 1140 with generating a combination log that combines a plurality of the true measurement values for each logging depth. The processing unit 220 can generate the combination log by generating a weighted sum of the plurality of true measurement values based on a weight function. The processing unit 220 can generate the weighted sum as described above with respect to FIGS. 7A-8B and Equation (4). As described above with respect to FIGS. 7A-7B and Equation (4), the weight function can include a piecewise function. Each of a plurality of subfunctions of the piecewise function can correspond to a range of parameter values.

Example method 1100 can further including controlling, by the processing unit 220, the logging system 200, or another system, a drilling operation based on formation parameters or based on the combination log.

Figure 12:
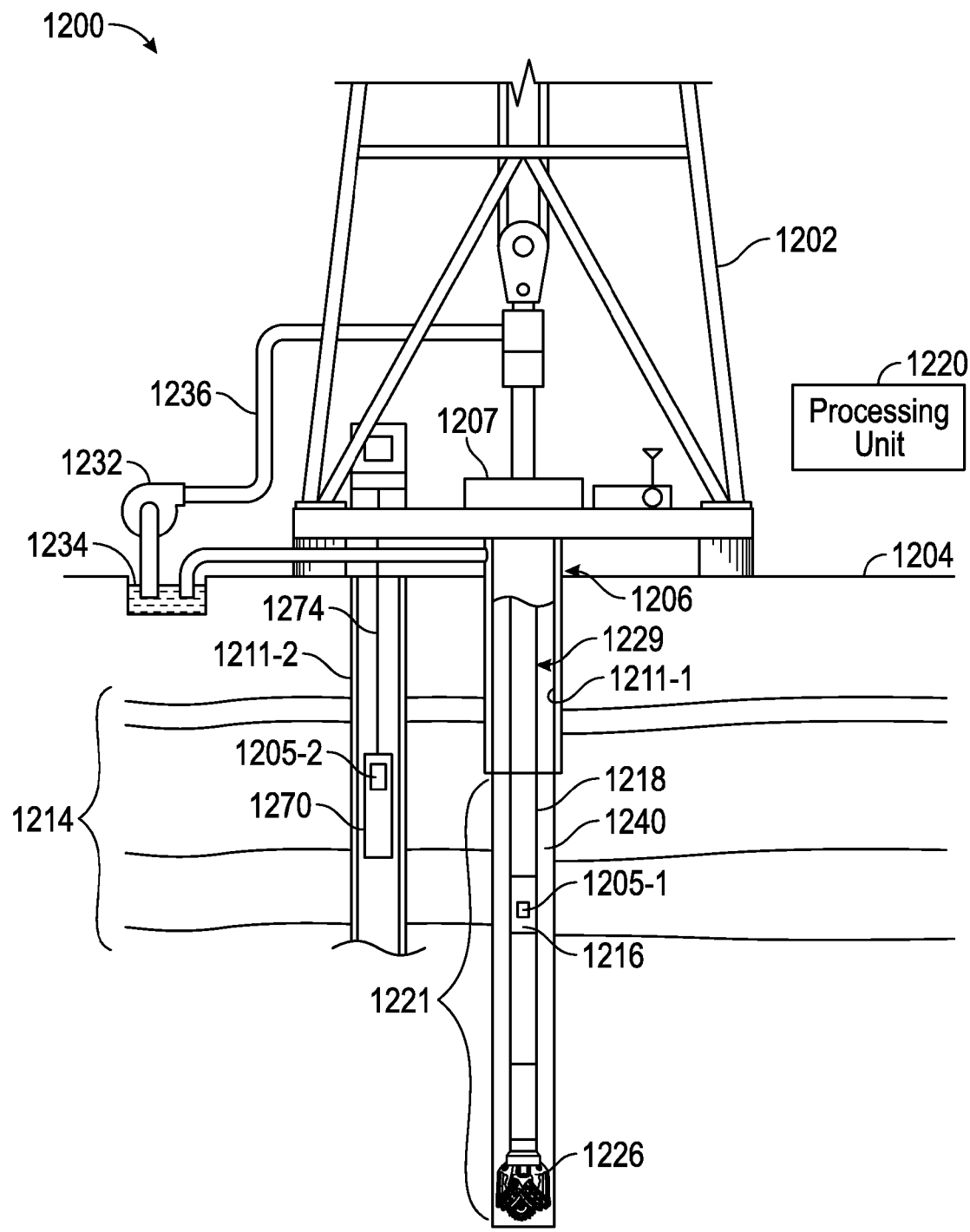
FIG. 12 depicts an example system at a drilling site, where the system is operable to control an MCI tool to conduct measurements in a wellbore and to implement applications of homogeneous inversion, in accordance with various embodiments.

FIG. 12 depicts an embodiment of a system 1200 at a drilling site, where the system 1200 includes an apparatus operable to control an MCI tool to conduct measurements in a wellbore and to implement multi-frequency inversion using data derived from operating the MCI tool. The system 1200 can include a tool 1205-1, 1205-2, or both 1205-1 and 1205-2 having an arrangement of transmitter antennas and receiver antennas operable to make measurements that can be used for a number of drilling tasks including, but not limited to, processing MCI data. The tools 1205-1 and 1205-2 can be identical to or similar to a tool architecture or combinations of tool architectures discussed herein, including control units and processing units operable to perform processing schemes in a manner identical to or similar to processing techniques discussed herein. The tools 1205-1, 1205-2, or both 1205-1 and 1205-2 can be distributed among the components of system 1200. The tools 1205-1 and 1205-2 can include functionalities and components of control units, transmitters, receivers, and processing units discussed herein. The tools 1205-1 and 1205-2 can be structured and fabricated in accordance with various embodiments as taught herein.

The system 1200 can include a drilling rig 1202 located at a surface 1204 of a well 1206 and a string of drill pipes, that is, drill string 1229, connected together so as to form a drilling string that is lowered through a rotary table 1207 into a wellbore or borehole 1211-1. The drilling rig 1202 can provide support for the drill string 1229. The drill string 1229 can operate to penetrate rotary table 1207 for drilling the borehole 1211-1 through subsurface formations 1214. The drill string 1229 can include a drill pipe 1218 and a bottom hole assembly 1221 located at the lower portion of the drill pipe 1218.

The bottom hole assembly 1221 can include a drill collar 1216 and a drill bit 1226. The drill bit 1226 can operate to create the borehole 1211-1 by penetrating the surface 1204 and the subsurface formations 1214. The bottom hole assembly 1221 can include the tool 1205-1 attached to the drill collar 1216 to conduct measurements to determine formation parameters. The tool 1205-1 can be structured for an implementation as a MWD system such as a LWD system. The housing containing the tool 1205-1 can include electronics to initiate measurements from selected transmitter antennas and to collect measurement signals from selected receiver antennas. Such electronics can include a processing unit to provide an analysis of MCI data over a standard communication mechanism for operating in a well. Alternatively, electronics can include a communications interface to provide measurement signals collected by the tool 1205-1 to the surface 1204 over a standard communication mechanism for operating in a well, where these measurements signals can be analyzed at a processing unit 1220 at the surface 1204 to provide analysis of MCI data.

During drilling operations, the drill string 1229 can be rotated by the rotary table 1207. In addition to, or alternatively, the bottom hole assembly 1221 can also be rotated by a motor (e.g., a mud motor) that is located downhole. The drill collars 1216 can be used to add weight to the drill bit 1226. The drill collars 1216 also can stiffen the bottom hole assembly 1221 to allow the bottom hole assembly 1221 to transfer the added weight to the drill bit 1226, and in turn, assist the drill bit 1226 in penetrating the surface 1204 and the subsurface formations 1214.

During drilling operations, a mud pump 1232 can pump drilling fluid (sometimes known by those of ordinary skill in the art as "drilling mud") from a mud pit 1234 through a hose 1236 into the drill pipe 1218 and down to the drill bit 1226. The drilling fluid can flow out from the drill bit 1226 and be returned to the surface 1204 through an annular area 1240 between the drill pipe 1218 and the sides of the borehole 1211-1. The drilling fluid may then be returned to the mud pit 1234, where such fluid is filtered. In some embodiments, the drilling fluid can be used to cool the drill bit 1226, as well as to provide lubrication for the drill bit 1226 during drilling operations. Additionally, the drilling fluid may be used to remove subsurface formation cuttings created by operating the drill bit 1226.

In various embodiments, the tool 1205-2 may be included in a tool body 1270 coupled to a logging cable 1274 such as, for example, for wireline applications. The tool body 1270 containing the tool 1205-2 can include electronics to initiate measurements from selected transmitter antennas and to collect measurement signals from selected receiver antennas. Such electronics can include a processing unit to provide analysis of MCI data over a standard communication mechanism for operating in a well. Alternatively, electronics can include a communications interface to provide measurement signals collected by the tool 1205-2 to the surface over a standard communication mechanism for operating in a well, where these measurements signals can be analyzed at a processing unit 1220 at the surface to provide analysis of MCI data. The logging cable 1274 may be realized as a wireline (multiple power and communication lines), a mono-cable (a single conductor), or a slick-line (no conductors for power or communications), or other appropriate structure for use in the borehole 1211-2. Though FIG. 12 depicts both an arrangement for wireline applications and an arrangement for LWD applications, the system 1200 may be structured to provide one of the two applications.

Although specific embodiments have been illustrated and described herein, it will be appreciated by those of ordinary skill in the art that any arrangement that is calculated to achieve the same purpose may be substituted for the specific embodiments shown. Various embodiments use permutations or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A method of measuring a formation property, the method comprising:
   obtaining a plurality of measurements of a formation parameter, each measurement obtained in response to energy propagated into a formation at a frequency of a plurality of frequencies of propagated energy;
   processing the measurements over each of the plurality of frequencies to obtain estimated values of the formation parameter;
   selecting an estimated value from the obtained estimated values for a logging depth as a true measurement value for the logging depth based on one or more of the plurality of frequencies and a resistivity range; and
   generating a combination log that combines a plurality of the true measurement values for the logging depth.

2. The method of claim 1, further comprising:
   propagating the energy by a tool that includes a plurality of triaxial subarrays.

3. The method of claim 1, wherein generating the combination log includes:
   generating a weighted sum of multiple ones of the true measurement value based on a weight function.

4. The method of claim 3, wherein the weight function includes a piecewise function, each of a plurality of sub-functions of the piecewise function corresponding to a range of values of the formation parameter values.

5. The method of claim 3, wherein the estimated value includes a temperature-corrected resistivity value or a calibrated resistivity value.

6. The method of claim 3, wherein the estimated value includes an enhanced apparent resistivity value, generation of the enhanced apparent resistivity value based on a mathematical transformation of combinations of apparent resistivity values.

7. The method of claim 3, wherein the estimated value includes a radially inverted resistivity value or a vertically inverted resistivity value.

8. The method of claim 3, wherein the formation parameter includes a radially inverted formation parameter.

9. The method of claim 8, wherein the radially inverted formation parameter includes a radially inverted resistivity parameter, a radially inverted dip parameter, or a radially inverted strike parameter.

10. The method of claim 1, wherein the plurality of frequencies includes at least three frequencies.

11. The method of claim 1, wherein the combination log is generated using a joint inversion and frequency consolidation operation applied to logs of formation parameters at the plurality of frequencies.

12. The method of claim 11, wherein the joint inversion is applied to calibrated resistivity responses.

13. The method of claim 11, wherein the joint inversion is applied to a radially inverted version of the formation parameter, the radially inverted version of the formation parameter including a radially inverted resistivity value, a radially inverted dip value, or a radially inverted strike value.

14. The method of claim 1, further including controlling a drilling operation based on formation parameter values in the combination log.

15. A logging system including:
an induction tool configured to propagate energy at a plurality of frequencies into a formation, and to provide a plurality of measurements of a formation parameter responsive to the propagated energy; and
a processing unit coupled to the induction tool and configured to
obtain the plurality of measurements from the induction tool,
process the measurements over each of the plurality of frequencies to obtain estimated values of the formation parameter,
select an estimated value from the estimated values for a logging depth as a true measurement value for the logging depth based on one or more of the plurality of frequencies and a resistivity range, and
generate a combination log that combines a plurality of the true measurement values for the logging depth.

16. The logging system of claim 15 wherein the induction tool comprises a multiaxial tool including a plurality of multiaxial subarrays.

17. The logging system of claim 15, further comprising:
a display to display the combination log; and
a memory to store the plurality of measurements of the formation parameter, such that a frequency at which one of the measurements was taken is associated with that corresponding one of the measurements.

18. The logging system of claim 15, wherein the induction tool is operable at three or more frequencies.

19. The logging system of claim 15, wherein the plurality of multiaxial subarrays includes a plurality of triaxial subarrays.

20. A non-transitory machine-readable storage device having instructions stored thereon, which, when performed by a machine, cause the machine to perform operations, the operations comprising:
obtaining a plurality of measurements of a formation parameter, each measurement obtained in response to energy propagated into the formation at a plurality of frequencies of propagated energy by a tool that includes a plurality of triaxial subarrays;
processing the measurements over each of the plurality of frequencies to obtain estimated values of the formation parameter;
selecting an estimated value from the estimated values for a logging depth as a true measurement value for the logging depth based on one or more of the plurality of frequencies and a resistivity range; and
generating a combination log that combines a plurality of the true measurement values for the logging depth.

21. The machine-readable storage device of claim 20, having further instructions stored thereon, which, when performed by a machine, cause the machine to generate the combination log by generating a weighted sum of a plurality of the true measurement values based on a piecewise function, each of a plurality of subfunctions of the piecewise function corresponding to a range of formation parameter values.

22. The machine-readable storage device of claim 20, wherein the estimated value includes a temperature-corrected resistivity value, a calibrated resistivity value, or an enhanced apparent resistivity value, the enhanced apparent resistivity value being generated based on a mathematical transformation of combinations of apparent resistivity values.

23. The machine-readable storage device of claim 20, having further instructions stored thereon, which, when performed by a machine, cause the machine to:
receive an indication of an error condition related to a first frequency of the plurality of frequencies, and
disregard measurements associated with the first frequency from use in the processing, responsive to receiving the indication.

24. The machine-readable storage device of claim 20, wherein the machine performs at least a portion of the processing, the selecting, or the generating in parallel with at least another portion of the processing, the selecting, or the generating.

* * * * *